US012713020B2

(12) United States Patent
Bross et al.

(10) Patent No.: US 12,713,020 B2

(45) Date of Patent: Aug. 18, 2026

(54) CODING CONCEPTS FOR A TRANSFORMED REPRESENTATION OF A SAMPLE BLOCK

(71) Applicant: Fraunhofer-Gesellschaft Zur Förderung der angewandten Forschung e.V., Munich (DE)

(72) Inventors: Benjamin Bross, Berlin (DE); Santiago De Luxán Hernández, Berlin (DE); Heiko Schwarz, Berlin (DE); Detlev Marpe, Berlin (DE); Thomas Wiegand, Berlin (DE)

(73) Assignee: Fraunhofer-Gesellschaft Zur Förderung der angewandten Forschung e.V., Munich (DE)

( * ) Notice: Subject to any disclaimer, the term of this patent is extended or adjusted under 35 U.S.C. 154(b) by 138 days.

(21) Appl. No.: 18/674,789

(22) Filed: May 24, 2024

(65) Prior Publication Data

US 2024/0314313 A1 Sep. 19, 2024

Related U.S. Application Data

(63) Continuation of application No. 17/780,429, filed as application No. PCT/EP2020/083440 on Nov. 25, 2020, now Pat. No. 12,034,928.

(30) Foreign Application Priority Data

Nov. 26, 2019 (EP) .................................... 19211643

(51) Int. Cl.
*H04N 19/12* (2014.01)
*H04N 19/129* (2014.01)
(Continued)

(52) U.S. Cl.
CPC .......... *H04N 19/12* (2014.11); *H04N 19/129* (2014.11); *H04N 19/167* (2014.11); *H04N 19/176* (2014.11); *H04N 19/18* (2014.11)

(58) Field of Classification Search
CPC .... H04N 19/12; H04N 19/129; H04N 19/167; H04N 19/176; H04N 19/18
(Continued)

(56) References Cited

U.S. PATENT DOCUMENTS 9,456,216 B2 9/2016 Holcomb
2004/0028131 A1* 2/2004 Ye ........................ H04N 19/187 375/E7.091

(Continued)

FOREIGN PATENT DOCUMENTS

EP 2607823 A2 6/2013
EP 2955923 A1 12/2015

(Continued)

OTHER PUBLICATIONS

International Search Report and Written Opinion received in Patent Cooperation Treaty Application No. PCT/EP2020/083440, dated Mar. 25, 2021.

(Continued)

*Primary Examiner* — Dominic D Saltarelli
(74) *Attorney, Agent, or Firm* — Conley Rose, P.C.

(57) ABSTRACT

Decoder for decoding a transformed representation of a sample block from a data stream. If a first coded coefficient is located inside a predetermined subarea of the transform coefficient block and if the underlying transform is within a first set of available transforms, the decoder decodes coefficients along a first coefficient scan order. If the transform is within a second set of available transforms, the decoder decodes coefficients located within the predetermined subarea along a second coefficient scan order, and infers that (Continued)

coefficients located outside the predetermined subarea are zero. The first coefficient scan order is so that coefficients outside the predetermined subarea are scanned between two transform coefficients located inside the predetermined subarea. The second coefficient scan order does not scan any coefficient outside the predetermined subarea between scanning the coefficients within the predetermined subarea.

18 Claims, 15 Drawing Sheets

(51) Int. Cl.

| | |
|---|---|
| ***H04N 19/167*** | (2014.01) |
| ***H04N 19/176*** | (2014.01) |
| ***H04N 19/18*** | (2014.01) |

(58) Field of Classification Search

USPC .................................................... 375/240.18

See application file for complete search history.

(56) References Cited

U.S. PATENT DOCUMENTS

| | | | |
|---|---|---|---|
| 2013/0064294 | A1 | 3/2013 | Sole Rojals |
| 2021/0211644 | A1 | 7/2021 | Su |
| 2022/0394300 | A1 | 12/2022 | Koo |

FOREIGN PATENT DOCUMENTS

| | | | |
|---|---|---|---|
| EP | 2559244 | B1 | 2/2017 |
| ES | 2607823 | T3 | 4/2017 |
| PT | 2693752 | A1 | 2/2014 |
| WO | 2019185883 | A1 | 10/2019 |
| WO | 2021096174 | A1 | 5/2021 |

OTHER PUBLICATIONS

Chiang, Man-Shu, et al., "CE6-Related: Latency Reduction for LFNST Signalling", Joint Video Experts Team of ITU-T SG 16 WP 3 and ISO/IEC JTC 1/SC 29/WG 11, Document: JVET-00293-v5, 15th Meeting: Gothenburg, SE, Jul. 3-12, 2019.

Coban, Muhammed, et al., "CE7-Related: Coefficient Scanning and Last Position Coding for TUs of Greater than 32 Width or Height", Joint Video Experts Team of ITU-T SG 16 WP 3 and ISO/IEC JTC 1/SC 29/WG 11, Document: JVET-M0257, 13th Meeting: Marrakech, MA, Jan. 8-18, 2019.

Sole, J., et al., "Transform Coefficient Coding in HEVC", 2012 Picture Coding Symposium, May 7-9, 2012, pp. 161-464.

* cited by examiner

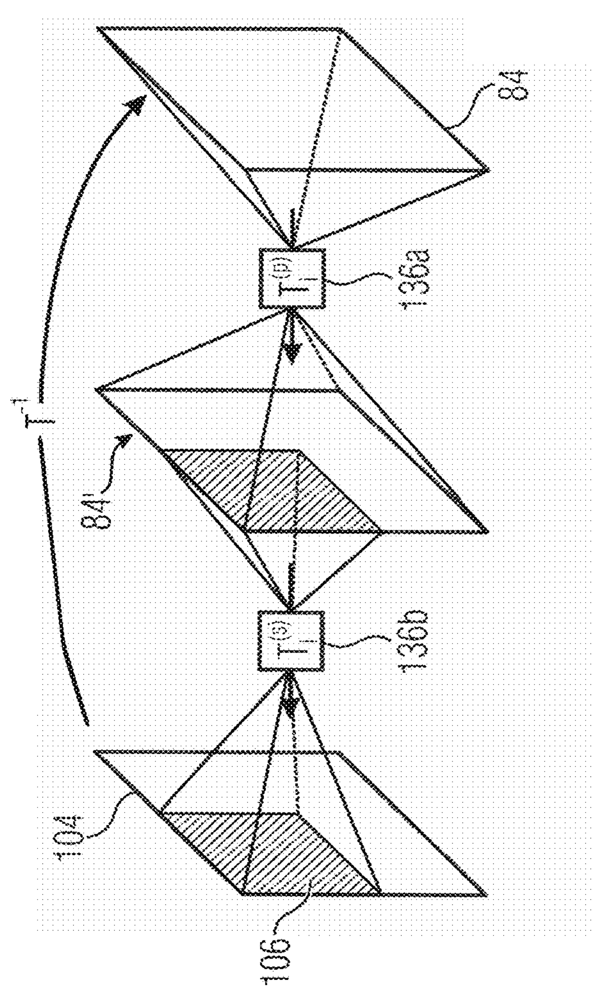
e.g. $T_1^{(p)} = T_{N2}^{(p)} = T_0$ (e.g. DCT-II)
e.g. $N_2 = 2$
e.g. $N_1 = 4$
Fig. 11a
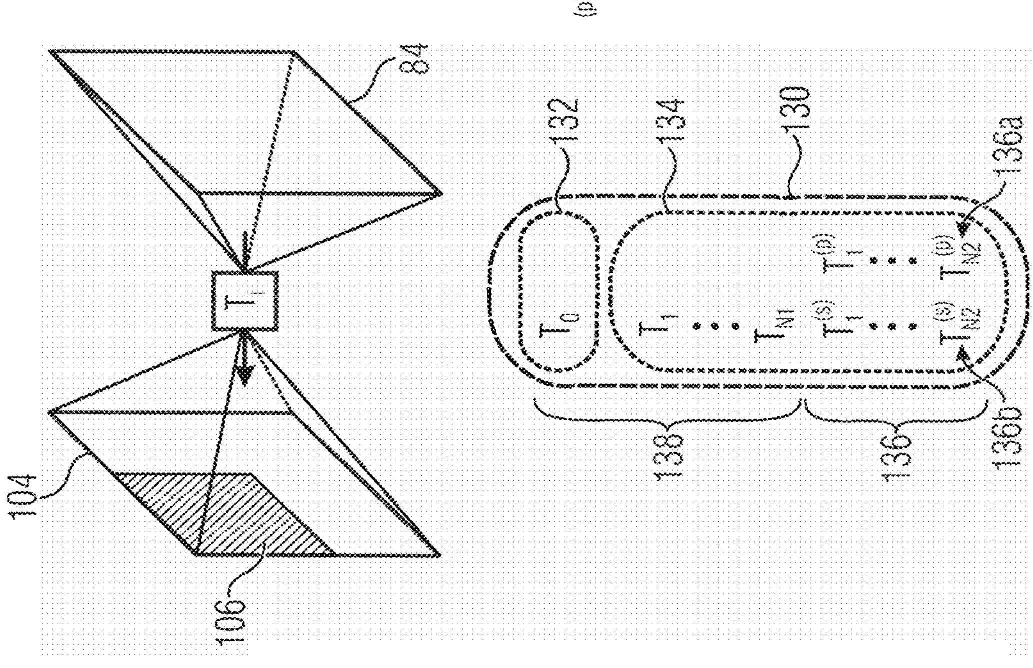

CODING CONCEPTS FOR A TRANSFORMED REPRESENTATION OF A SAMPLE BLOCK

This application is a continuation of U.S. application Ser. No. 17/780,429 filed on May 26, 2022, which is a national phase application of and claims priority to Patent Cooperation Treaty Application No. PCT/EP2020/083440 filed Nov. 25, 2020, which claims priority to European Application No. 19211643.2 filed Nov. 26, 2019 with the European Patent Office, all of which are incorporated herein by reference in their entirety for all purposes.

DESCRIPTION

Technical Field

Embodiments according to the invention related to Decoder for decoding a transformed representation of a sample block from a data stream, Encoder for encoding a transformed representation of a sample block into a data stream, corresponding methods, Computer programs having a program code for performing, when running on a computer, a method for decoding/encoding a transformed representation of a sample block from/into a data stream and a data stream.

Introduction

Hybrid video compression schemes, such as AVC and HEVC, rely on block-based prediction followed by transform of the prediction residual, quantization of the transform coefficients, and entropy coding of the quantization indices. The latter is also referred to as transform coefficient coding or residual coding. The following description uses the term transform also for integer approximations of transforms as implemented in practical hybrid video compression schemes.

Conventionally, a fixed transform is specified in a video coding standard for each potential block size N×N. For example, the HEVC standard specifies the usage of a DCT-II, except for intra-picture predicted 4×4 blocks, for which a DST-VI is used. Higher compression efficiency can be achieved by enabling a choice between multiple pre-defined transform types. The current draft for Versatile Video Coding (VVC) specifies a set of five different horizontal and vertical transform type combinations (including the DCT-II, DST-VII, and DCT-VIII). The bitstream includes a syntax by which the transform type selected by the encoder is signaled to the decoder. The coding of transform coefficient levels is independent of and signaled before the selected transform type. For complexity reasons, non-DCT-II transform types are applied only to rows and columns that contain no more than 16 non-zero coefficients. In this case, the blocks to be transformed (transform blocks) can have a width and height greater than 16 but all coefficients outside the top-left 16×16 area are required to be zero. Furthermore, the transforms are applied to the complete transform block greater than 16×16 so that the resulting block of residual samples is also greater than 16×16. This way of reducing the implementation logic of transforms is further referred to as zero-out.

Furthermore, the current VVC draft specifies an additional low frequency non-separable transform (LFNST), which can be applied after the transform at the encoder and its inverse at the decoder before the inverse transform. For this LFNST multiple transform kernels can be selected at the encoder and signaled to the decoder using an LFNST index. For complexity reason, the LFNST can only be combined with the DCT-II in the current VVC draft.

BACKGROUND OF THE INVENTION

Current state-of-the-art video coding technologies, including the VVC development, specify means to signal one of multiple pre-defined transform types. The transform coefficient levels are coded before the syntax indicating the selected transform, e.g. a multiple transform selection (MTS) index.

The transform coefficient levels are coded in subblocks or coefficient groups. The subblocks are processed in using one scan pattern and the coefficient inside the subblocks are processed using a scan pattern as well. As in the current VVC draft 7, both scan patterns can be a backward/reverse diagonal scan. However, other scan pattern and directions can be employed as well. FIG. 1 illustrates an example of a 32×32 transform block 104, which is subdivided into 64 4×4 subblocks 117. In this example, the subblocks 117 are processed reverse diagonal scan 115, i.e. from bottom-right 103 to top-left corner 101). FIG. 1 shows a backwards/inverse diagonal scanning of 4×4 subblocks 117 inside a 32×32 transform block 104. DCT-based transforms tend to concentrate the energy in the top left corner 101 and thus, quantized coefficient values tend to become zero in the bottom-right corner 103 of the block, i.e. the transform block 104, after quantization. To prevent coding and decoding a sequence of zeros before the first non-zero coefficient 102 in scan order 115, the position of the first (last) non-zero or significant coefficient 102 in (inverse) scan order 115 is signaled before processing the subblock. Knowing that, only the subblock 117 that contains this first significant coefficient, i.e. the first non-zero coefficient 102, and all subsequent subblocks 117 in scan order 115 are processed, as shown on the right side of FIG. 1.

Longer transforms, e.g. with 32 coefficients in one direction, require more logic and memory in implementations. As already mentioned before, this motivated the zero-out design in the current VVC draft. In this design, all transform types can be applied to 32 coefficients in each direction, but for the non-DCT-II types, the last 16 coefficients in each direction are required to be equal to 0. FIG. 2 illustrates this process where a 32×32 block, e.g. a sample block 84, of reconstructed residual samples is generated by applying a transform on a 32×32 transform block 104 where only the first 16×16 coefficients can be non-zero. FIG. 2 shows a transform coefficient level zero-out of a 32×32 transform block 104 before inverse transform 40/54.

The information of which transform is selected, e.g. an MTS index, is signaled after the transform coefficients. Consequently, the position of the first or last significant coefficient 102 is known. When this coefficient is outside the 16×16 non-zero area, i.e. the predetermined subarea 106, there is no need to signal the transform selection because the only allowed transform in this case is the DCT-II. However, in this current design, it cannot be guaranteed that all coefficients outside the 16×16 area are equal to zero. This can be seen in the example on the right-hand side in FIG. 3, where the last position, i.e. the first or last coded coefficient position 102, is located inside the 16×16 non-zero area but subsequent subblocks in scan pattern 110 are outside this area. In case that these non-zero coefficients exist, an encoder constraint has to ensure that the signaled transform is the DCT-II, e.g. by always signaling an MTS index equal to 0. This produces a signaling overhead because the DCT-II is explicitly signaled although always required to be equal to 0. In the following a non-zero requirement might define that all non-zero transform coefficients are located inside the non-zero area, i.e. the predetermined subarea 106, and that all transform coefficients outside the non-zero area have to be zero. In the following two approaches are described to tackle this aspect. FIG. 3 shows on the left-hand side a modified diagonal scanning 110 of subblocks for zero-out, according to an embodiment of the invention.

When the multiple transform selection is combined with an additional transform, such as the aforementioned LFNST, the combination can also be restricted to reduce implementation logic. In the current VVC draft, e.g., the LFSNT can only be combined with the DCT-II and an LFNST index, indicating whether LFNST is applied and if applied which kernel, is signaled before the MTS index. When the LFNST index indicates the use of an LFNST kernel, the MTS index is not signaled and inferred to be equal to 0, i.e. DCT-II. A simplified syntax diagram is illustrated on the left-hand side of FIG. 13.

Therefore, it is desired to provide concepts for rendering picture coding and/or video coding more efficient to support choosing between multiple pre-defined transform types for a block of a picture. Additionally, or alternatively, it is desired to reduce a bit stream and thus a signalization cost, e.g., reducing signaling overhead.

This is achieved by the subject matter of the independent claims of the present application.

Further embodiments according to the invention are defined by the subject matter of the dependent claims of the present application.

SUMMARY OF THE INVENTION

In accordance with a first aspect of the present invention, the inventors of the present application realized that one problem encountered when trying to enable a selection of a transform for a block of a picture stems from the fact that for some transforms, e.g., transforms within a second set of transforms, like non-DCT-II transforms, it is required that non-zero coefficients of a transform coefficient block are only allowed/located in a predetermined subarea of the transform coefficient block. Depending on a position of a first coded coefficient position, i.e. a first non-zero coefficient, inside the predetermined subarea of the transform coefficient block, it is possible that zero coefficients outside the predetermined subarea are decoded/encoded along a coefficient scan order. The transform coefficients might be scanned according to the coefficient scan order from the first coded coefficient position onwards to a last scanning position, e.g., the coefficient in the top-left corner, i.e. a DC coefficient, or from a coefficient in the top-left corner of the transform coefficient block onwards to the first coded coefficient position, which might be understood as a last coded coefficient position in this latter case. According to the first aspect of the present application, this difficulty of decoding/encoding zero coefficients is overcome by using a different scanning order for transform coefficient blocks associated with transforms within a first set of one or more available transforms of a set of available transforms than for transform coefficient blocks associated with transforms within a second set of one or more available transforms of the set of available transforms. In case the transform coefficient block is associated with a transform within the first set of one or more available transforms, the transform coefficient block comprises non-zero coefficients outside the predetermined subarea of the transform coefficient block, and in case the transform coefficient block is associated with a transform within the second set of one or more available transforms, the transform coefficient block comprises non-zero coefficients only inside the predetermined subarea of the transform coefficient block. The inventors found, that using different coefficient scan orders dependent on a transform underlying the respective transform coefficient block is advantageous in terms of improving coding efficiency and reducing signaling overhead. This is based on the idea that the transform can indicate whether all non-zero coefficients are located inside the predetermined subarea of the transform coefficient block or not, whereby the scan order can be chosen such that only non-zero transform coefficients are decoded/encoded along the chosen scan order. If the transform underlying the transform coefficient block is within the first set of one or more available transforms, values of the transform coefficients of the transform coefficient block which are, along the first coefficient scan order, located from the first coded coefficient position onwards to a last scanned position, are decoded/encoded and a decoder infers that transform coefficients of the transform coefficient block which are, along the first coefficient scan order, located upstream the first coded coefficient position, are zero. If the transform underlying the transform coefficient block is within the second set of one or more available transforms, values of transform coefficients of the transform coefficient block which are located within the predetermined subarea and are, along a second coefficient scan order, located from the first coded coefficient position onwards to the last scanned position, are decoded/encoded and a decoder infers that transform coefficients of the transform coefficient block which are, along the first coefficient scan order, located upstream the first coded coefficient position and transform coefficients of the transform coefficient block which are located outside the predetermined subarea are zero. Thus it can be prevented to decode/encode zero coefficients improving the coding efficiency, since less transform coefficients might be needed to scan.

Accordingly, in accordance with a first aspect of the present application, a decoder/encoder for decoding/encoding a transformed representation of a sample block from/into a data stream, is configured to decode/encode a coefficient position information from/into the data stream. The coefficient position information is indicative of a first coded coefficient position within a transform coefficient block. The first coded coefficient position might either indicate a position of a first non-zero transform coefficient in coefficient scan order or a position of a last non-zero transform coefficient in an inverse coefficient scan order. The decoder/encoder is configured to check whether the first coded coefficient position is located within a predetermined subarea of the transform coefficient block. The predetermined subarea might define a subarea of the transform coefficient block, inside which subarea transform coefficients can be non-zero and outside of which subarea all transform coefficients have to be zero for certain transforms. According to an embodiment, the transform coefficient block can comprise non-zero transform coefficients outside the predetermined subarea, in case the transform underlying the transform coefficient block is within a first set of one or more available transforms of a set of available transforms, and the transform coefficients outside the predetermined subarea are zero, in case the transform underlying the transform coefficient block is within a second set of one or more available transforms of the set of available transforms. The predetermined subarea might consist of 16×16 transform coefficients. The predetermined subarea might be located in the top-left of the transform coefficient block. If the first coded coefficient position is located inside the predetermined subarea of the transform coefficient block, it is checked whether the transform underlying the transform coefficient block is within the first set of one or more available transforms of the set of available transforms or the second set of one or more available transforms of the set of available transforms. The decoder is configured to perform this check, using transformation information transmitted in the data stream. If the transform underlying the transform coefficient block is within the first set of one or more available transforms, the decoder/encoder is configured to decode/encode the values of the transform coefficients of the transform coefficient block which are, along a first coefficient scan order, located from the first coded coefficient position onwards to a last scanned position, wherein transform coefficients of the transform coefficient block which are, along the first coefficient scan order, located upstream the first coded coefficient position are zero. If the transform underlying the transform coefficient block is within the first set of one or more available transforms, the decoder is configured to infer that the transform coefficients of the transform coefficient block which are, along the first coefficient scan order, located upstream the first coded coefficient position are zero. If the transform underlying the transform coefficient block is within the second set of one or more available transforms, the decoder/encoder is configured to decode/encode values of transform coefficients of the transform coefficient block which are located within the predetermined subarea and are, along a second coefficient scan order, located from the first coded coefficient position onwards to the last scanned position, wherein transform coefficients of the transform coefficient block which are, along the first coefficient scan order, located upstream the first coded coefficient position and transform coefficients of the transform coefficient block which are located outside the predetermined subarea are zero. If the transform underlying the transform coefficient block is within the second set of one or more available transforms, the decoder is configured to infer that transform coefficients of the transform coefficient block which are, along the first coefficient scan order, located upstream the first coded coefficient position and transform coefficients of the transform coefficient block which are located outside the predetermined subarea are zero. The transform underlying the transform coefficient block along with the transform coefficient block defines the transformed representation. The second coefficient scan order scans the transform coefficients within the predetermined subarea without scanning any transform coefficient outside the predetermined subarea between the transform coefficients within the predetermined subarea, and the first coefficient scan order scans the transform coefficients in a manner so that there are one or more transform coefficients outside the predetermined subarea which are scanned by the first coefficient scan order between two transform coefficients located inside the predetermined subarea.

According to an embodiment, the decoder/encoder is configured to, if the first coded coefficient position is located outside the predetermined subarea of the transform coefficient block, reduce a set of available transforms to the first set of one or more available transforms by removing from the set of available transforms the second set of one or more available transforms and determine the transform underlying the transform coefficient block out of the first set of one or more available transforms. The decoder/encoder is configured to decode/encode the values of the transform coefficients of the transform coefficient block which are, along the first coefficient scan order, located from the first coded coefficient position onwards to a last scanned position, wherein the transform coefficients of the transform coefficient block which are, along the first coefficient scan order, located upstream the first coded coefficient position are zero. The decoder is configured to infer that the transform coefficients of the transform coefficient block which are, along the first coefficient scan order, located upstream the first coded coefficient position are zero. Thus, in case the first coded coefficient position is located outside the predetermined subarea of the transform coefficient block, it is possible for the decoder to infer the transform underlying the transform coefficient block and it is not necessary for the encoder to encode transformation information related to the transform coefficient block into the data stream, whereby the bitstream can be reduced and a high coding efficiency can be achieved.

According to an embodiment, the decoder/encoder is configured to decode/encode the transformation information from/into the data stream using context-adaptive entropy decoding/encoding, e.g. context adaptive binary arithmetic coding, using a predetermined probability model, e.g., an estimated probability for a certain, e.g., LPS (least probable symbol), binary value as updated for a certain context. The decoder/encoder is configured to determine the predetermined probability model depending on where the first coded coefficient position is located within the transform coefficient block. The decoder/encoder might be configured to determine the predetermined probability model via determining the, e.g., continuously updated, context depending on where the first coded coefficient position is located within the transform coefficient block.

According to an embodiment, the decoder/encoder is configured to, in determining the predetermined probability model depending on where the first coded coefficient position is located within the transform coefficient block, set the predetermined probability model to a first probability model, e.g., first context, if the first coded coefficient position coincides with the last scanned position, set the predetermined probability model to a second probability model, e.g., second context, if the first coded coefficient position is, along the first coefficient scan order, no more than a predetermined number of transform coefficients away from the last scanned position, and set the predetermined probability model to a third probability model, e.g., third context, if the first coded coefficient position is, along the first coefficient scan order, more than the predetermined number of transform coefficients away from the last scanned position. The first and second coefficient scan orders coincide in the last scanned position and the predetermined number of transform coefficients upstream the last scanned position. In other words, up until that predetermined number, both scans are the same, or in even other words, both scans end at the last scanned position and are equal in the predetermined number of coefficients upstream the last scanned position. In other words, upstream the last scanned position up until that predetermined number, both scans are the same. The predetermined probability model might be set to the first probability model, if the transform coefficient block comprises only one non-zero transform coefficient. This single non-zero transform coefficient is located at the first coded coefficient position.

According to another embodiment, the decoder/encoder is configured to, in determining the predetermined probability model depending on where the first coded coefficient position is located within the transform coefficient block, set the predetermined probability model to a first probability model, if the first coded coefficient position is, along the first coefficient scan order, no more than a predetermined number of transform coefficients away from, or coincides with the last scanned position and set the predetermined probability model to a second probability model, if the first coded transform coefficient position is, along the first coefficient scan order, more than the predetermined number of coefficients away from the last scanned position. The first and second coefficient scan orders coincide in the last scanned position and the predetermined number of transform coefficients upstream the last scanned position.

According to an embodiment, the set of available transforms comprises one or more multi-stage transforms which correspond to a concatenation of a primary transform and a secondary transform within the predetermined subarea and consist of the primary transform outside the predetermined subarea, and which are contained in the second set of one or more available transforms. In other words, the second set of one or more available transforms of the set of available transforms comprises the one or more multi-stage transforms. Additionally, the set of available transforms comprises a set of primary-only transforms comprising one or more first primary-only transforms out of which the first set of one or more available transforms consists, and one or more second primary-only transforms which are contained in the second set of one or more available transforms. The decoder/encoder is configured to decode/encode a secondary transform indicator from/into the data stream, the secondary transform indicator indicating whether the transform underlying the transform coefficient block is a multi-stage transform, i.e. within the second set of one or more available transforms, and which one out of the one or more multi-stage transforms, or whether the transform underlying the transform coefficient block is a primary-only transform. If the secondary transform indicator indicates that the transform underlying the transform coefficient block is a primary-only transform, the decoder/encoder is configured to decode/encode a transform indicator, e.g., a primary transform indicator, from/into the data stream which identifies the primary-only transform out of the set of primary-only transforms. Only the secondary transform indicator has to be decoded/encoded from/into the data stream in case the transform underlying the transform coefficient block is a multi-stage transform, since the secondary transform indicator already indicates the primary transform and the secondary transform. Thus, a high coding efficiency can be achieved, since the additional transform indicator might only be necessary in case the transform underlying the transform coefficient block is not a multi-stage transform.

According to an embodiment, the set of available transforms comprises a set of one or more multi-stage transforms which correspond to a concatenation of a primary transform and a secondary transform within the predetermined subarea and consist of the primary transform outside the predetermined subarea, and which are contained in the second set of one or more available transforms. Additionally, the set of available transforms comprises a set of primary-only transforms comprising one or more first primary-only transforms out of which the first set of one or more available transforms consists, and one or more second primary-only transforms which are contained in the second set of one or more available transforms. The decoder/encoder is configured to decode/encode a secondary transform indicator from/into the data stream. The secondary transform indicator indicates whether the transform underlying the transform coefficient block is a multi-stage transform, and, if yes, the secondary transform of the multi-stage transform, or whether the transform underlying the transform coefficient block is a primary-only transform. In other words, the secondary transform indicator indicates whether the transform underlying the transform coefficient block is a multi-stage transform or a primary-only transform. The decoder/encoder is configured to decode/encode a primary transform indicator from/into the data stream which identifies, in case of the secondary transform indicator indicating that the transform underlying the transform coefficient block is a primary-only transform, the primary-only transform out of the set of primary-only transforms, and, in case of the secondary transform indicator indicating that the transform underlying the transform coefficient block is a multi-stage transform, and if the set of one or more multi-stage transforms comprises more than one multi-stage transform with mutually different primary transforms, the primary transform of the multi-stage transform. Thus a high variability and flexibility in the selection of the transform underlying the transform coefficient block, especially in terms of multi-stage transforms, can be achieved, resulting in a high coding efficiency. In case all multi-stage transforms are associated with the same primary transform, i.e. the multi-stage transforms do not have mutually different primary transforms, it is not necessary to decode/encode the primary transform indicator.

According to an embodiment, the set of available transforms comprises multi-stage transforms, e.g., a set of two or more multi-stage transforms, each of which corresponds to a concatenation of a primary transform and a secondary transform within the predetermined subarea and consists of the primary transform outside the predetermined subarea, and which is contained in the second set of one or more available transforms. The second set of one or more available transforms might comprise all multi-stage transforms. Additionally, the set of available transforms comprises a set of primary-only transforms comprising a first primary-only transform, e.g., a DCT-II transform, out of which the first set of one or more available transforms consists, and to which the primary transform for all of the one or more multi-stage transforms is equal, and one or more second primary-only transforms, e.g. non-DCT-II transforms, which are contained in the second set of one or more available transforms. The decoder/encoder is configured to decode/encode a primary transform indicator from/into the data stream, the primary transform indicator indicating a first transform out of a set, e.g. the set of primary-only transforms, including the first primary-only transform and the one or more second primary-only transforms. If the first transform is the first primary-only transform, the decoder/encoder is configured to decode/encode a secondary transform indicator from/into the data stream which identifies the transform underlying the transform coefficient block out of a set including the first primary-only transform and the multi-stage transforms, wherein the transform underlying the transform coefficient block is, in case of the first transform being one of the one or more second primary-only transforms, the one second primary-only transform. In other words, if the primary transform indicator indicates that the first transform is one out of the one or more second primary-only transforms, the transform underlying the transform coefficient block is the indicated second primary-only transform, and if the primary transform indicator indicates that the first transform is the first primary-only transform, the transform underlying the transform coefficient block is, depending on the secondary transform indicator, either the first primary-only transform or a multi-stage transform corresponding to a concatenation of the first primary-only transform and a secondary transform. In the latter case, the secondary transform indicator might directly indicate/point to the transform underlying the transform coefficient block. Thus, the transform underlying the transform coefficient block can be selected and indicated in the data stream very efficiently resulting in a high coding efficiency.

According to an embodiment, the set of available transforms comprises a set of multi-stage transforms each of which corresponds to a concatenation of a primary transform and a secondary transform within the predetermined subarea and consists of the primary transform outside the predetermined subarea, and which is contained in the second set of one or more available transforms. Additionally, the set of available transforms comprises a set of primary-only transforms comprising one or more first primary-only transforms out of which the first set of one or more available transforms consists, and one or more second primary-only transforms which are contained in the second set of one or more available transforms. The decoder/encoder is configured to decode/encode a primary transform indicator from/into the data stream. The primary transform indicator indicates a first transform out of a set, e.g., out of the set of primary-only transforms, including the one or more first primary-only transforms and the one or more second primary-only transforms. If the first transform is a first primary-only transform which is equal to a primary transform of one or more of the multi-stage transforms, the decoder/encoder is configured to decode/encode a secondary transform indicator from/into the data stream which identifies the transform underlying the transform coefficient block out of a set including the first primary-only transform and the one or more multi-stage transforms whose primary transform equals the first primary-only transform. The special primary transform indicator and secondary transform indicator result in a high coding efficiency enabling, among other things, a great choice between different first primary-only transforms and between different multi-stage transforms with different primary transforms for a selection of the transform underlying the transform coefficient block. By enabling such a choice, it is possible to achieve a high compression efficiency.

According to an embodiment, the decoder/encoder is configured to perform the decoding/encoding of the primary transform indicator from/into the data stream using context-adaptive entropy decoding/encoding using a predetermined probability model. The decoder/encoder is configured to determine the predetermined probability model depending on where the first coded coefficient position is located within the transform coefficient block.

According to an embodiment, the decoder/encoder is configured to, in determining the predetermined probability model depending on where the first coded coefficient position is located within the transform coefficient block, set the predetermined probability model to a first probability model, if the first coded coefficient position coincides with the last scanned position, set the predetermined probability model to a second probability model, if the first coded coefficient position is, along the first coefficient scan order, no more than a predetermined number of transform coefficients away from the last scanned position, and set the predetermined probability model to a third probability model, if the first coded coefficient position is, along the first coefficient scan order, more than the predetermined number of transform coefficients away from the last scanned position. The first and second coefficient scan orders coincide in the last scanned position and the predetermined number of transform coefficients upstream the last scanned position.

According to an embodiment, the decoder/encoder is configured to, in determining the predetermined probability model depending on where the first coded coefficient position is located within the transform coefficient block, set the predetermined probability model to a first probability model, if the first coded coefficient position is, along the first coefficient scan order, no more than a predetermined number of transform coefficients away from, or coincides with the last scanned position, and set the predetermined probability model to a second probability model, if the first coded transform coefficient position is, along the first coefficient scan order, more than the predetermined number of coefficients away from the last scanned position. The first and second coefficient scan orders coincide in the last scanned position and the predetermined number of transform coefficients upstream the last scanned position.

According to an embodiment, the primary transform is equal for all of the one or more multi-stage transforms and is also equal to one of the one or more first primary-only transforms.

According to an embodiment, there is only one first primary-only transform.

According to an embodiment, the encoder is configured to subject the sample block to the transform underlying the transform coefficient block so as to obtain the transform coefficient block.

According to an embodiment, the decoder is configured to subject the transform coefficient block to a reverse transformation which reverses the transform underlying the transform coefficient block so as to obtain the sample block. According to an embodiment, the encoder comprises a feedback loop configured to subject the transform coefficient block to a reverse transformation which reverses the transform underlying the transform coefficient block so as to obtain the sample block.

According to an embodiment, the encoder is configured to derive a prediction residual of a prediction signal gained by intra-picture or inter-picture prediction and determine the sample block, e.g. including a quantization, to represent the prediction residual.

According to an embodiment, the decoder is configured to use the sample block to correct a prediction signal gained by intra-picture or inter-picture prediction. According to an embodiment, the encoder comprises a feedback loop configured to use the sample block to correct a prediction signal gained by intra-picture or inter-picture prediction.

In accordance with a second aspect of the present invention, the inventors of the present application realized that one problem encountered when trying to enable a selection of a transform for a block of a picture stems from the fact that for some transforms, like non-DCT-II transforms, it is required that non-zero coefficients of a transform coefficient block are only allowed in a predetermined subarea of the transform coefficient block. Currently, a signaling overhead is produced to indicate the transform underlying the transform coefficient block, when transforms with the above described non-zero requirement can also be chosen. According to the second aspect of the present application, this difficulty is overcome by checking whether all transform coefficients of the transform coefficient block which are, along a predetermined coefficient scan order, located from a first coded coefficient position onwards to a last scanned position are, if not located within the predetermined subarea of the transform coefficient block, zero. The inventors found that it is advantageous to check whether non-zero transform coefficients are located outside the predetermined subarea, since even if the first coded coefficient position is located inside the predetermined subarea, it is still possible that non-zero transform coefficients are located along the predetermined scan order outside the predetermined subarea. This is based on the idea that the check enables to automatically identify, whether the transform underlying the transform coefficient block is a transform with the above described non-zero requirement or not. Thus it is not necessary, for each transform coefficient block, to select the transform underlying the respective transform coefficient block out of a set of all available transforms. Instead it is, with this feature, possible to reduce the set of all available transforms to the relevant transforms, whereby a high coding efficiency can be achieved. Furthermore, a high compression can be achieved, since it is not necessary to indicate by an additional syntax element whether the transform underlying the transform coefficient block is one out of transforms with the non-zero requirement or one out of transforms without the non-zero requirement.

Accordingly, in accordance with a second aspect of the present application, a decoder/encoder for decoding/encoding a transformed representation of a sample block from/into a data stream, is configured to decode/encode a coefficient position information from/into the data stream. The coefficient position information is indicative of a first coded coefficient position within a transform coefficient block. The first coded coefficient position might either indicate a position of a first non-zero transform coefficient in coefficient scan order or a position of a last non-zero transform coefficient in an inverse coefficient scan order. Furthermore, the decoder/encoder is configured to decode/encode values of transform coefficients of the transform coefficient block which are, along a predetermined coefficient scan order, located from the first coded coefficient position onwards to a last scanned position, and infer that transform coefficients of the transform coefficient block which are, along the predetermined coefficient scan order, located upstream the first coded coefficient position are zero. The transform coefficients of the transform coefficient block which are, along the predetermined coefficient scan order, located from the first coded coefficient position onwards to the last scanned position, might either comprise only transform coefficients with a value being non-zero or transform coefficients with a value being zero and transform coefficients with a value being non-zero. The decoder/encoder is configured to check whether all transform coefficients of the transform coefficient block which are, along the predetermined coefficient scan order, located from the first coded coefficient position onwards to the last scanned position are, if not located within a predetermined subarea of the transform coefficient block, zero. The predetermined subarea might define a subarea of the transform coefficient block, inside which subarea transform coefficients can be non-zero and outside of which subarea all transform coefficients have to be zero for certain transforms. According to an embodiment, the transform coefficient block can comprise non-zero transform coefficients outside the predetermined subarea, in case the transform underlying the transform coefficient block is within a first set of one or more available transforms of a set of available transforms, and the transform coefficients outside the predetermined subarea are zero, in case the transform underlying the transform coefficient block is within a second set of one or more available transforms of the set of available transforms. The predetermined subarea might consist of 16×16 transform coefficients. The predetermined subarea might be located in the top-left of the transform coefficient block. If all transform coefficients of the transform coefficient block which are, along the predetermined coefficient scan order, located from the first coded coefficient position onwards to the last scanned position are, if not located within the predetermined subarea of the transform coefficient block, zero, the decoder/encoder is configured to decode/encode a transformation information from/into the data stream and identify, using the transformation information, a transform underlying the transform coefficient block out of a set of available transforms, e.g., out of the second set of one or more available transforms of the set of available transforms. If not all transform coefficients of the transform coefficient block which are, along the predetermined coefficient scan order, located from the first coded coefficient position onwards to the last scanned position are, if not located within the predetermined subarea of the transform coefficient block, zero, the decoder/encoder is configured to reduce the set of available transforms to the first set of one or more available transforms by removing from the set of available transforms the second set of one or more available transforms and determine the transform underlying the transform coefficient block out of the first set of one or more available transforms. The transform underlying the transform coefficient block along with the transform coefficient block defines the transformed representation. The predetermined coefficient scan order scans the transform coefficients in a manner so that there are one or more transform coefficients outside the predetermined subarea which are scanned by the predetermined coefficient scan order between two transform coefficients located inside the predetermined subarea.

According to an embodiment, the decoder/encoder is configured to check whether the first coded coefficient position is located within the predetermined subarea of the transform coefficient block, and check whether all transform coefficients which are located outside the predetermined subarea of the transform coefficient block and are, along the predetermined coefficient scan order, located from the first coded coefficient position onwards to the last scanned position are zero. The latter check is optionally merely performed if the first coded coefficient position is located within the predetermined subarea of the transform coefficient block. In case, the first coded coefficient position is located outside the predetermined subarea of the transform coefficient block, the decoder/encoder might be configured to infer that not all transform coefficients of the transform coefficient block which are, along the predetermined coefficient scan order, located from the first coded coefficient position onwards to the last scanned position are, if not located within the predetermined subarea of the transform coefficient block, zero.

According to an embodiment, the decoder/encoder can comprise features and or functionalities as described with regard to the decoder/encoder according to the first aspect, if the first coded coefficient position is located within the predetermined subarea of the transform coefficient block.

According to an embodiment, the decoder/encoder is configured to perform the decoding/encoding of the transformation information from/into the data stream using context-adaptive entropy decoding/encoding using a predetermined probability model and determine the predetermined probability model depending on where the first coded coefficient position is located within the transform coefficient block.

According to an embodiment, the decoder/encoder is configured to, in determining the predetermined probability model depending on where the first coded coefficient position is located within the transform coefficient block, set the predetermined probability model to a first probability model, if the first coded coefficient position coincides with the last scanned position, set the predetermined probability model to a second probability model, if the first coded coefficient position is, along the predetermined coefficient scan order, no more than a predetermined number of transform coefficients away from the last scanned position, and set the predetermined probability model to a third probability model, if the first coded coefficient position is, along the predetermined coefficient scan order, more than the predetermined number of transform coefficients away from the last scanned position.

According to another embodiment, the decoder/encoder is configured to, in determining the predetermined probability model depending on where the first coded coefficient position is located within the transform coefficient block, set the predetermined probability model to a first probability model, if the first coded coefficient position is, along the predetermined coefficient scan order, no more than a predetermined number of transform coefficients away from, or coincides with the last scanned position, and set the predetermined probability model to a second probability model, if the first coded transform coefficient position is, along the predetermined coefficient scan order, more than the predetermined number of coefficients away from the last scanned position.

According to an embodiment, the set of available transforms comprises multi-stage transforms, e.g., a set of multi-stage transforms, each of which corresponds to a concatenation of a primary transform and a secondary transform within the predetermined subarea and consists of the primary transform outside the predetermined subarea, and which is contained in the second set of one or more available transforms. In other words, the second set of one or more available transforms of the set of available transforms comprises the two or more multi-stage transforms. Additionally, the set of available transforms comprises a set of primary-only transforms comprising a first primary-only transform out of which the first set of one or more available transforms consists, and to which the primary transform for all of the one or more multi-stage transforms is equal, and one or more second primary-only transforms which are contained in the second set of one or more available transforms. The decoder/encoder is configured to, if all transform coefficients of the transform coefficient block which are, along the predetermined coefficient scan order, located from the first coded coefficient position onwards to the last scanned position are, if not located within the predetermined subarea of the transform coefficient block, zero,

- decode/encode a secondary transform indicator from/into the data stream, the secondary transform indicator indicating whether the transform underlying the transform coefficient block is a multi-stage transform, and which one out of the one or more multi-stage transforms, or whether the transform underlying the transform coefficient block is a primary-only transform, i.e. whether same belongs to the set of primary-only transforms or to the set of multi-stage transforms, and
- check whether the secondary transform indicator indicates that the transform underlying the transform coefficient block is a primary-only transform. If the secondary transform indicator indicates that the transform underlying the transform coefficient block is a primary-only transform, the decoder/encoder is configured to decode/encode a transform indicator, e.g., a primary transform indicator, from/into the data stream which identifies the primary-only transform out of the set of primary-only transforms.

If not all transform coefficients of the transform coefficient block which are, along the predetermined coefficient scan order, located from the first coded coefficient position onwards to the last scanned position are, if not located within the predetermined subarea of the transform coefficient block, zero, the transform underlying the transform coefficient block is the first primary-only transform. With this embodiment, it is possible to infer that the transform underlying the transform coefficient block is the first primary-only transform, if the transform coefficient block comprises non-zero transform coefficients outside the predetermined subarea. Thus, for such transform coefficient blocks, the data stream does not need to comprise transformation information, whereby a high compression can be achieved. Furthermore, it is possible to explicitly indicate a multi-stage transform as the transform underlying the transform coefficient block using the secondary transform indicator and by using additionally to the secondary transform indicator the primary transform indicator, it is possible to unambiguously indicate a primary-only transform as the transform underlying the transform coefficient block. It is to be noted that, with this special transform selection, it is possible to also indicate the first primary-only transform as the transform underlying the transform coefficient block for blocks with all non-zero transform coefficients inside the predetermined subarea, whereby a great choice of transforms is provided achieving a high compression efficiency.

According to an embodiment, the set of available transforms comprises multi-stage transforms, e.g., a set of multi-stage transforms, each of which corresponds to a concatenation of a primary transform and a secondary transform within the predetermined subarea and consists of the primary transform outside the predetermined subarea, and which is contained in the second set of one or more available transforms. Additionally, the set of available transforms comprises a set of primary-only transforms comprising a first primary-only transform out of which the first set of one or more available transforms consists, and to which the primary transform for all of the one or more multi-stage transforms is equal, and one or more second primary-only transforms which are contained in the second set of one or more available transforms. The decoder/encoder is configured to, if all transform coefficients of the transform coefficient block which are, along the predetermined coefficient scan order, located from the first coded coefficient position onwards to the last scanned position are, if not located within the predetermined subarea of the transform coefficient block, zero,

- decode/encode a primary transform indicator from/into the data stream, the primary transform indicator indicating a first transform out of a set, e.g., the set of primary-only transforms, including the first primary-only transform and the one or more second primary-only transforms,
  - if the first transform is the first primary-only transform, decode/encode a secondary transform indicator from/into the data stream which identifies the transform underlying the transform coefficient block out of a set including the first primary-only transform and the multi-stage transforms, and
  - in case of the first transform being one of the one or more second primary-only transforms, the transform underlying the transform coefficient block is, the one second primary-only transform.

If not all transform coefficients of the transform coefficient block which are, along the predetermined coefficient scan order, located from the first coded coefficient position onwards to the last scanned position are, if not located within the predetermined subarea of the transform coefficient block, zero, the transform underlying the transform coefficient block is the first primary-only transform.

According to an embodiment, the primary transform is equal for all of the one or more multi-stage transforms and is also equal to one of the one or more first primary-only transforms.

According to an embodiment, there is only one first primary-only transform.

According to an embodiment, the encoder is configured to subject the sample block to the transform underlying the transform coefficient block so as to obtain the transform coefficient block.

According to an embodiment, the decoder is configured to subject the transform coefficient block to a reverse transformation which reverses the transform underlying the transform coefficient block so as to obtain the sample block. According to an embodiment, the encoder comprises a feedback loop configured to subject the transform coefficient block to a reverse transformation which reverses the transform underlying the transform coefficient block so as to obtain the sample block.

According to an embodiment, the encoder is configured to derive a prediction residual of a prediction signal gained by intra-picture or inter-picture prediction and determine the sample block, e.g., including a quantization, to represent the prediction residual.

According to an embodiment, the decoder/encoder is configured to use the sample block to correct a prediction signal gained by intra-picture or inter-picture prediction. According to an embodiment, the encoder comprises a feedback loop configured to use the sample block to correct a prediction signal gained by intra-picture or inter-picture prediction.

An embodiment is related to a method for decoding/encoding a transformed representation of a sample block from/into a data stream, comprising decoding/encoding a coefficient position information from/into the data stream, wherein the coefficient position information is indicative of a first coded coefficient position within a transform coefficient block. The method comprises checking whether the first coded coefficient position is located within a predetermined subarea of the transform coefficient block. If the first coded coefficient position is located inside the predetermined subarea of the transform coefficient block, the method comprises checking whether a transform underlying the transform coefficient block is within a first set of one or more available transforms of a set of available transforms or a second set of one or more available transforms of the set of available transforms. The method for decoding can perform the check using transformation information transmitted in the data stream. If the transform underlying the transform coefficient block is within the first set of one or more available transforms, the method comprises decoding/encoding the values of the transform coefficients of the transform coefficient block which are, along the first coefficient scan order, located from the first coded coefficient position onwards to a last scanned position, wherein transform coefficients of the transform coefficient block which are, along the first coefficient scan order, located upstream the first coded coefficient position are zero. The method for decoding comprises inferring that the transform coefficients of the transform coefficient block which are, along the first coefficient scan order, located upstream the first coded coefficient position are zero. If the transform underlying the transform coefficient block is within the second set of one or more available transforms, the method comprises decoding/encoding values of transform coefficients of the transform coefficient block which are located within the predetermined subarea and are, along a second coefficient scan order, located from the first coded coefficient position onwards to the last scanned position, wherein the transform coefficients of the transform coefficient block which are, along the first coefficient scan order, located upstream the first coded coefficient position and transform coefficients of the transform coefficient block which are located outside the predetermined subarea are zero. The method for decoding comprises inferring that the transform coefficients of the transform coefficient block which are, along the first coefficient scan order, located upstream the first coded coefficient position and transform coefficients of the transform coefficient block which are located outside the predetermined subarea are zero. The transform underlying the transform coefficient block along with the transform coefficient block define the transformed representation. The second coefficient scan order scans the transform coefficients within the predetermined subarea without scanning any transform coefficient outside the predetermined subarea between the transform coefficients within the predetermined subarea, and the first coefficient scan order scans the transform coefficients in a manner so that there are one or more transform coefficients outside the predetermined subarea which are scanned by the first coefficient scan order between two transform coefficients located inside the predetermined subarea.

An embodiment is related to a method for decoding/encoding a transformed representation of a sample block from/into a data stream, comprising decoding/encoding a coefficient position information from/into the data stream, wherein the coefficient position information is indicative of a first coded coefficient position within a transform coefficient block. The method comprises decoding/encoding values of transform coefficients of the transform coefficient block which are, along a predetermined coefficient scan order, located from the first coded coefficient position onwards to a last scanned position, wherein transform coefficients of the transform coefficient block which are, along the predetermined coefficient scan order, located upstream the first coded coefficient position are zero. The method for decoding comprises inferring that the transform coefficients of the transform coefficient block which are, along the predetermined coefficient scan order, located upstream the first coded coefficient position are zero. Furthermore, the method comprises checking whether all transform coefficients of the transform coefficient block which are, along the predetermined coefficient scan order, located from the first coded coefficient position onwards to the last scanned position are, if not located within a predetermined subarea of the transform coefficient block, zero. If all transform coefficients of the transform coefficient block which are, along the predetermined coefficient scan order, located from the first coded coefficient position onwards to the last scanned position are, if not located within the predetermined subarea of the transform coefficient block, zero, the method comprises decoding/encoding a transformation information from/into the data stream and identifying a transform underlying the transform coefficient block out of a set of available transforms. The method for decoding might perform the identification using the transformation information. If not all transform coefficients of the transform coefficient block which are, along the predetermined coefficient scan order, located from the first coded coefficient position onwards to the last scanned position are, if not located within the predetermined subarea of the transform coefficient block, zero, the method comprises reducing the set of available transforms to a first set of one or more available transforms by removing from the set of available transforms a second set of one or more available transforms and determining the transform underlying the transform coefficient block out of the first set of one or more available transforms. The transform underlying the transform coefficient block along with the transform coefficient block defines the transformed representation. The predetermined coefficient scan order scans the transform coefficients in a manner so that there are one or more transform coefficients outside the predetermined subarea which are scanned by the predetermined coefficient scan order between two transform coefficients located inside the predetermined subarea.

The methods as described above are based on the same considerations as the above-described encoder/decoder. The methods can, by the way, be completed with all features and functionalities, which are also described with regard to the encoder/decoder.

An embodiment is related to a data stream having a picture or a video encoded thereinto using a herein described method for encoding.

An embodiment is related to a computer program having a program code for performing, when running on a computer, a herein described method.

BRIEF DESCRIPTION OF THE DRAWINGS

The drawings are not necessarily to scale, emphasis instead generally being placed upon illustrating the principles of the invention. In the following description, various embodiments of the invention are described with reference to the following drawings, in which:

FIG. 11*a* shows a set of available transforms, according to a first embodiment;

DETAILED DESCRIPTION OF THE EMBODIMENTS

Figure 1:
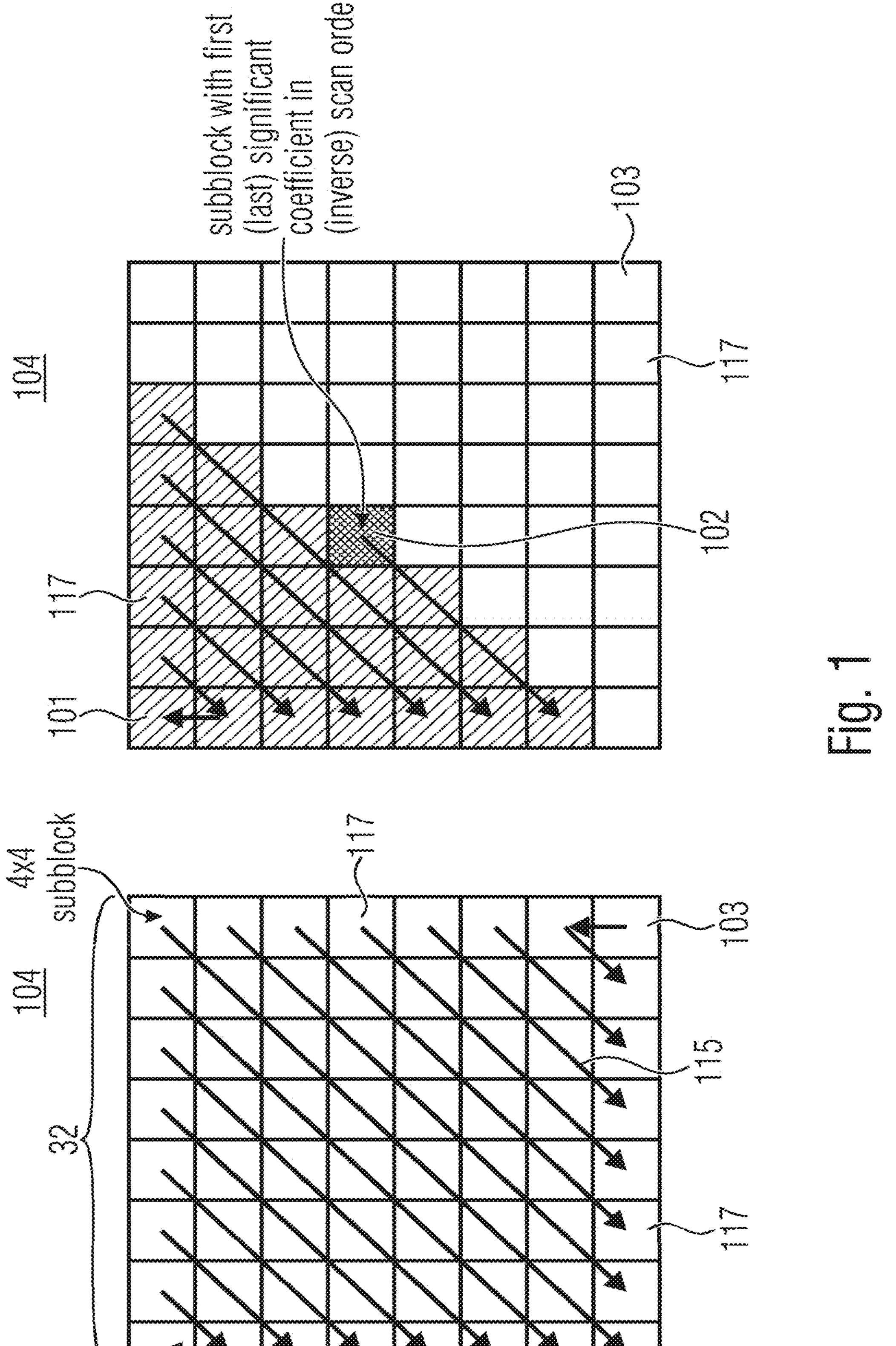
FIG. 1 shows an example of a 32×32 transform block which is subdivided into 64 4×4 subblocks.
Figure 2:
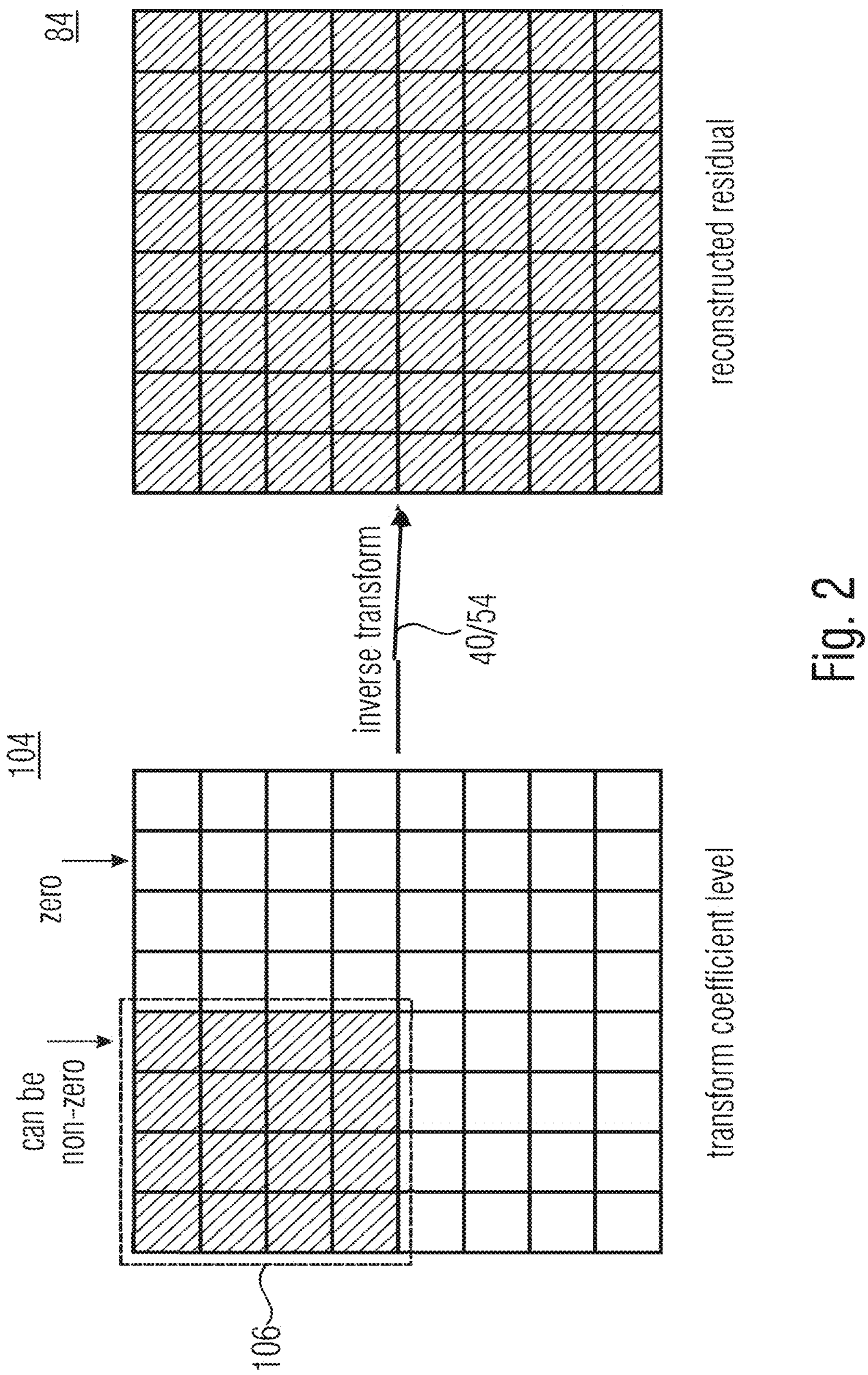
FIG. 2 shows a reconstruction of a 32×32 block, where only the first 16×16 coefficients can be non-zero.

Equal or equivalent elements or elements with equal or equivalent functionality are denoted in the following description by equal or equivalent reference numerals even if occurring in different figures.

In the following description, a plurality of details is set forth to provide a more throughout explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

Further, it is to be noted that herein non-zero transform coefficients define transform coefficients with non-zero values and zero transform coefficients define transform coefficients with zero values.

In the following, various examples are described which may assist in achieving a more effective compression by using Transform Type Signaling for Coefficient Level Coding Zero-out. Embodiments presented herein describe a signaling concept that restricts the area of coded transform coefficients that can be non-zero within a block depending on the selection of specific transform types with the aim of reducing signaling overhead and simplifying the encoding/decoding logic for hybrid video compression applications.

In order to ease the understanding of the following embodiments of the present application, the description starts with a presentation of a description of video encoder and video decoder of a block-based predictive codec for coding pictures of a video in order to form an example for a coding framework into which embodiments for coding and decoding a transformed representation of a sample block may be built in. The video encoder and video decoder are described with respect to FIGS. 4 to 6. The herein described embodiments of the present application, may be readily built into the video encoder and decoder of FIGS. 4 and 5, respectively, although the embodiments of the present application, may also be used to form video encoder and video decoders not operating according to the coding framework underlying the video encoder and video decoder of FIGS. 4 and 5.

Figure 4:
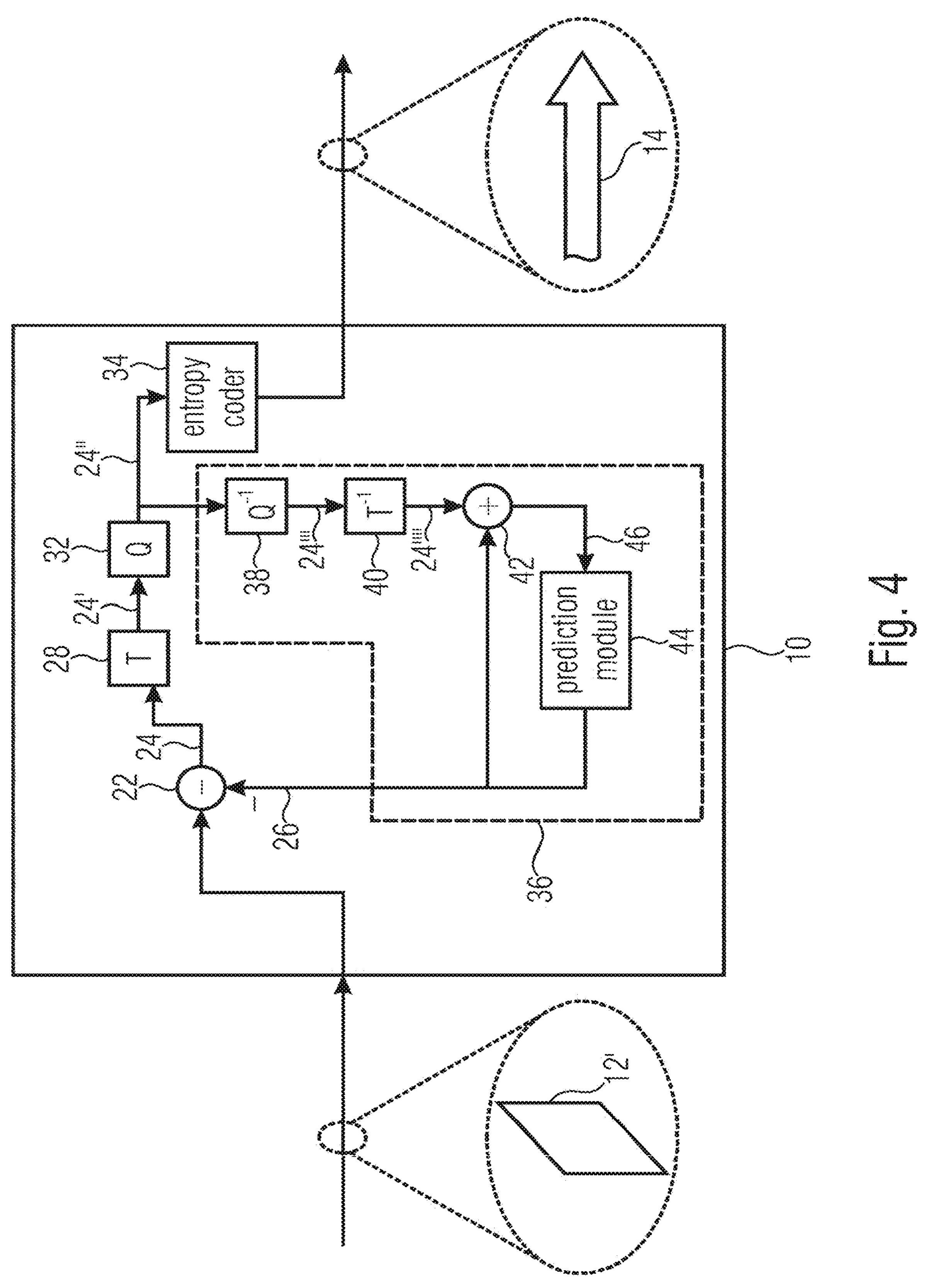
FIG. 4 shows an apparatus for predictively encoding a picture or a video.
Figure 5:
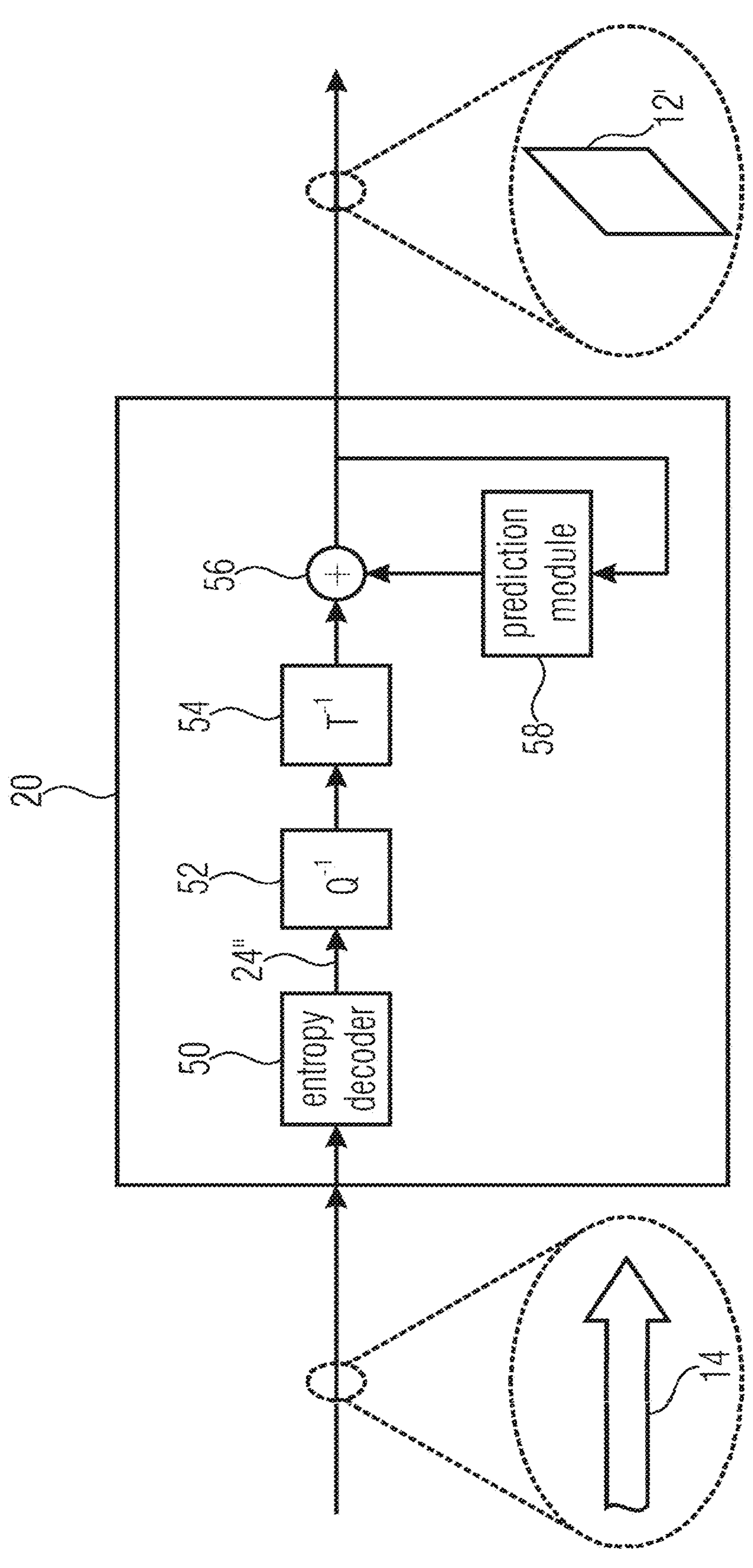
FIG. 5 shows an apparatus for predictively decoding a picture or a video.

FIG. 4 shows an apparatus for predictively coding a picture 12 or a video composed of a sequence of pictures 12 into a data stream 14. Block-wise predictive coding is used to this end. Further, transform-based residual coding is exemplarily used. The apparatus, or encoder, is indicated using reference sign 10. FIG. 5 shows a corresponding decoder 20, i.e. an apparatus 20 configured to predictively decode the picture 12' or the video composed of pictures 12' in picture blocks from the data stream 14, also here exemplarily using transform-based residual decoding, wherein the apostrophe has been used to indicate that the pictures 12' as reconstructed by decoder 20 deviate from pictures 12 originally encoded by apparatus 10 in terms of coding loss introduced by a quantization of the prediction residual signal. FIG. 4 and FIG. 5 exemplarily use transform based prediction residual coding, although embodiments of the present application are not restricted to this kind of prediction residual coding. This is true for other details described with respect to FIGS. 4 and 5, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. video or a current picture 12. The prediction residual signal former 22 may, for instance, be a subtractor which subtracts the prediction signal from the original signal, i.e. current picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction signal 26 is generated by a prediction stage 36 of encoder 10 on the basis of the prediction residual signal 24" decoded into, and decodable from, data stream 14. To this end, the prediction stage 36 may internally, as is shown in FIG. 4, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'.

A prediction module 44 of prediction stage 36 then generates the prediction signal 26 on the basis of signal 46 by using, for instance, spatial prediction, i.e. intra-prediction, and/or temporal prediction, i.e. inter-prediction. Details in this regard are described in the following.

Likewise, decoder 20 may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 5, the output of combiner 56 results in the reconstructed signal, namely the video or a current picture 12' thereof.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost, and/or using some rate control. As described in more details below, encoder 10 and decoder 20 and the corresponding modules 44, 58, respectively, support different prediction modes such as intra-coding modes and inter-coding modes which form a kind of set or pool of primitive prediction modes based on which the predictions of picture blocks are composed in a manner described in more detail below. The granularity at which encoder and decoder switch between these prediction compositions may correspond to a subdivision of the pictures 12 and 12', respectively, into blocks. Note that some of these blocks may be blocks being solely intra-coded and some blocks may be blocks solely being inter-coded and, optionally, even further blocks may be blocks obtained using both intra-coding and inter-coding, but details are set-out hereinafter. According to intra-coding mode, a prediction signal for a block is obtained on the basis of a spatial, already coded/decoded neighborhood of the respective block. Several intra-coding sub-modes may exist the selection among which, quasi, represents a kind of intra-prediction parameter. There may be directional or angular intra-coding sub-modes according to which the prediction signal for the respective block is filled by extrapolating the sample values of the neighborhood along a certain direction which is specific for the respective directional intra-coding sub-mode, into the respective block. The intra-coding sub-modes may, for instance, also comprise one or more further sub-modes such as a DC coding mode, according to which the prediction signal for the respective block assigns a DC value to all samples within the respective block, and/or a planar intra-coding mode according to which the prediction signal of the respective block is approximated or determined to be a spatial distribution of sample values described by a two-dimensional linear function over the sample positions of the respective block with deriving tilt and offset of the plane defined by the two-dimensional linear function on the basis of the neighboring samples. Compared thereto, according to inter-prediction mode, a prediction signal for a block may be obtained, for instance, by temporally predicting the block inner. For parametrization of an inter-prediction mode, motion vectors may be signaled within the data stream, the motion vectors indicating the spatial displacement of the portion of a previously coded picture of the video at which the previously coded/decoded picture is sampled in order to obtain the prediction signal for the respective block. This means, in addition to the residual signal coding comprised by data stream 14, such as the entropy-coded transform coefficient levels representing the quantized spectral-domain prediction residual signal 24", data stream 14 may have encoded thereinto prediction related parameters for assigning to the blocks prediction modes, prediction parameters for the assigned prediction modes, such as motion parameters for inter-prediction modes, and, optionally, further parameters which control a composition of the final prediction signal for the blocks using the assigned prediction modes and prediction parameters as will be outlined in more detail below. Additionally, the data stream may comprise parameters controlling and signaling the subdivision of picture 12 and 12', respectively, into the blocks. The decoder 20 uses these parameters to subdivide the picture in the same manner as the encoder did, to assign the same prediction modes and parameters to the blocks, and to perform the same prediction to result in the same prediction signal.

Figure 6:
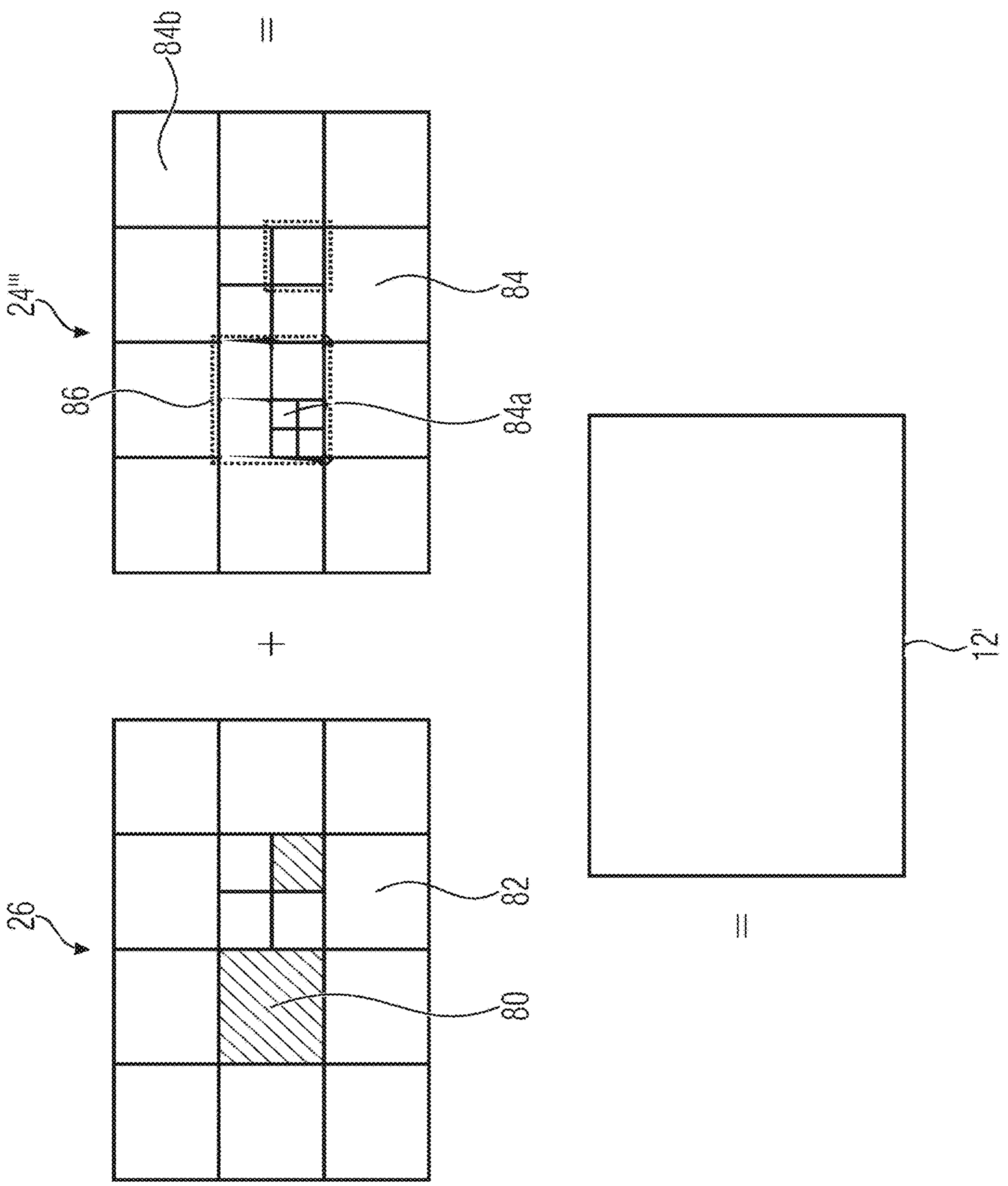
FIG. 6 shows a relationship between a reconstructed signal and a combination of a prediction residual signal and a prediction signal.

FIG. 6 illustrates the relationship between the reconstructed signal, i.e. the reconstructed picture 12', on the one hand, and the combination of the prediction residual signal 24'''' as signaled in the data stream, and the prediction signal 26, on the other hand. As already denoted above, the combination may be an addition. The prediction signal 26 is illustrated in FIG. 6 as a subdivision of the picture area into blocks 80 of varying size, although this is merely an example. The subdivision may be any subdivision, such as a regular subdivision of the picture area into rows and columns of blocks, or a multi-tree subdivision of picture 12 into leaf blocks of varying size, such as a quadtree subdivision or the like, wherein a mixture thereof is illustrated in FIG. 6 where the picture area is firstly subdivided into rows and columns of tree-root blocks which are then further subdivided in accordance with a recursive multi-tree subdivisioning to result into blocks 80.

The prediction residual signal 24"" in FIG. 6 is also illustrated as a subdivision of the picture area into blocks 84. These blocks might be called transform blocks or transform coefficient blocks in order to distinguish same from the coding blocks 80. In effect, FIG. 6 illustrates that encoder 10 and decoder 20 may use two different subdivisions of picture 12 and picture 12', respectively, into blocks, namely one subdivisioning into coding blocks 80 and another subdivision into blocks 84. Both subdivisions might be the same, i.e. each block 80, may concurrently form a transform block 84 and vice versa, but FIG. 6 illustrates the case where, for instance, a subdivision into transform blocks 84 forms an extension of the subdivision into blocks 80 so that any border between two blocks 80 overlays a border between two blocks 84, or alternatively speaking each block 80 either coincides with one of the transform blocks 84 or coincides with a cluster of transform blocks 84. However, the subdivisions may also be determined or selected independent from each other so that transform blocks 84 could alternatively cross block borders between blocks 80. As far as the subdivision into transform blocks 84 is concerned, similar statements are thus true as those brought forward with respect to the subdivision into blocks 80, i.e. the blocks 84 may be the result of a regular subdivision of picture area into blocks, arranged in rows and columns, the result of a recursive multi-tree subdivisioning of the picture area, or a combination thereof or any other sort of segmentation. Just as an aside, it is noted that blocks 80 and 84 are not restricted to being quadratic, rectangular or any other shape. Further, the subdivision of a current picture 12 into blocks 80 at which the prediction signal is formed, and the subdivision of a current picture 12 into blocks 84 at which the prediction residual is coded, may not the only subdivision used for coding/decoding. These subdivisions from a granularity at which prediction signal determination and residual coding is performed, but firstly, the residual coding may alternatively be done without subdivisioning, and secondly, at other granularities than these subdivisions, encoder and decoder may set certain coding parameters which might include some of the aforementioned parameters such as prediction parameters, prediction signal composition control signals and the like.

FIG. 6 illustrates that the combination of the prediction signal 26 and the prediction residual signal 24"" directly results in the reconstructed signal 12'. However, it should be noted that more than one prediction signal 26 may be combined with the prediction residual signal 24"" to result into picture 12' in accordance with alternative embodiments such as prediction signals obtained from other views or from other coding layers which are coded/decoded in a separate prediction loop with separate DPB, for instance.

In FIG. 6, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in the spatial domain directly. However, in accordance with embodiments described herein, encoder 10 and decoder 20 are configured in such a manner that they support several transforms namely the set of available transforms 130, as described with respect to one or more of the following FIGS. 7 to 12.

In the following, embodiments will be described by which the coding efficiency for transform type signaling can be improved and/or by which the compression efficiency can be improved by enabling a choice between multiple transform types. The embodiments in the following will mostly illustrate the features and functionalities in view of a decoder. However, it is clear that the same or similar features and functionalities can be comprised by an encoder, e.g., a decoding performed by a decoder can correspond to an encoding by the encoder. Furthermore, the encoder might comprise the same features as described with regard to the decoder in a feedback loop, e.g., in the prediction stage 36.

Figure 7:
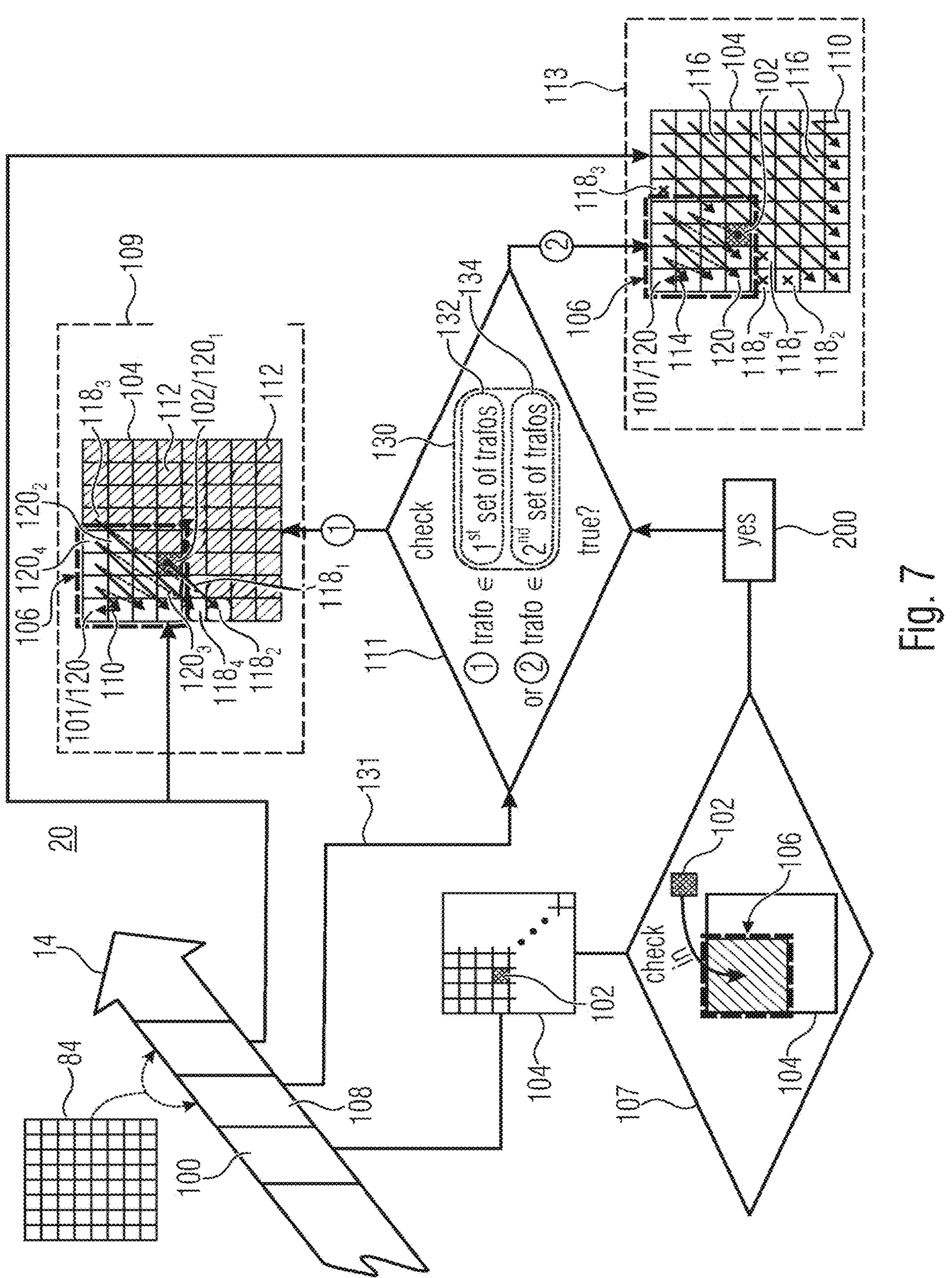
FIG. 7 shows a decoder which is able to change the scanning order, according to an embodiment.

FIG. 7 shows a decoder 20 for decoding a transformed representation of a sample block 84 from a data stream 14. According to an embodiment, an encoder is configured to subject the sample block 84 to a transform underlying a transform coefficient block 104 so as to obtain the transform coefficient block 104. The transform coefficient block 104 along with the transform 131 underlying the transform coefficient block 104 define the transformed representation.

The decoder 20 shown in FIG. 7 is configured to decode a coefficient position information 100 from the data stream 14. The coefficient position information 100 is indicative of a first coded coefficient position 102 within the transform coefficient block 104. The first coded coefficient position 102 might indicate a position of a first non-zero transform coefficient in scan order, e.g. in a first coefficient scan order 110 or in a second coefficient scan order 114. In case of a reverse/inverse scan order, the first coded coefficient position 102 might indicate a position of a last non-zero transform coefficient along the reverse/inverse scan order. A non-zero transform coefficient defines herein a transform coefficient with a value unequal to zero and a zero transform coefficient defines a transform coefficient with a value equal to zero.

The decoder 20 is configured to check 107 whether the first coded coefficient position 102 is located within a predetermined subarea 106 of the transform coefficient block 104.

If the first coded coefficient position 102 is located inside the predetermined subarea 106 of the transform coefficient block 104, the decoder 20 is configured to check 111, using transformation information 108 transmitted in the data stream 14, whether the transform 131 underlying the transform coefficient block 104 is within a first set 132 of one or more available transforms of a set 130 of available transforms or a second set 134 of one or more available transforms of the set 130 of available transforms. According to an embodiment, the first set 132 of one or more available transforms comprises transforms for transform coefficient blocks 104 with non-zero transform coefficients outside the predetermined subarea, like the transform coefficients 118. According to an embodiment, the second set 134 of one or more available transforms comprises transforms for transform coefficient blocks 104 without any non-zero transform coefficients outside the predetermined subarea 106. In other words, the one or more transforms out of the second set 134 of one or more available transforms might have the requirement, i.e. a non-zero requirement, that all transform coefficients outside the predetermined subarea have values equal to zero and that the non-zero transform coefficients are only located inside the predetermined subarea 106. The transforms out of the first set 132 of one or more available transforms might not have to meet this non-zero requirement.

If the transform 131 underlying the transform coefficient block 104 is within the first set 132 of one or more available transforms, the decoder 20 is configured to decode 109 the values of the transform coefficients of the transform coefficient block 104 which are, along the first coefficient scan order 110, located from the first coded coefficient position 102 onwards to a last scanned position 101, and infer that transform coefficients 112 of the transform coefficient block 104 which are, along the first coefficient scan order 110, located upstream the first coded coefficient position 102 are zero. As shown in FIG. 7, for this first condition, the decoder 20 might be configured to infer that all transform coefficients 112 in the shaded area of the transform coefficient block 104 are zero. The first coefficient scan order 110 scans the transform coefficients of the transform coefficient block 104 in a manner so that there are one or more transform coefficients 118 outside the predetermined subarea 106 which are scanned by the first coefficient scan order 110 between two transform coefficients 120 located inside the predetermined subarea 106. As shown in the embodiment of FIG. 7 exemplarily, the transform coefficients $\mathbf{118}_1$-$\mathbf{118}_3$ outside the predetermined subarea 106 are scanned by the first coefficient scan order 110 between the two transform coefficients $\mathbf{120}_1$ and $\mathbf{120}_2$ located inside the predetermined subarea 106 and the transform coefficient $\mathbf{118}_4$ outside the predetermined subarea 106 is scanned by the first coefficient scan order 110 between the two transform coefficients $\mathbf{120}_3$ and $\mathbf{120}_4$ located inside the predetermined subarea 106.

If the transform 131 underlying the transform coefficient block 104 is within the second set 134 of one or more available transforms, the decoder 20 is configured to decode 113 values of transform coefficients of the transform coefficient block 104 which are located within the predetermined subarea 106 and are, along a second coefficient scan order 114, located from the first coded coefficient position 102 onwards to the last scanned position 101, and infer that transform coefficients 116 of the transform coefficient block 104 which are, along the first coefficient scan order 110, located upstream the first coded coefficient position 102 and transform coefficients 118 of the transform coefficient block 104 which are located outside the predetermined subarea 106 are zero. The second coefficient scan order 114 scans the transform coefficients 120 within the predetermined subarea 106 without scanning any transform coefficient 118 outside the predetermined subarea 106 between the transform coefficients 120 within the predetermined subarea 106.

Figure 8:
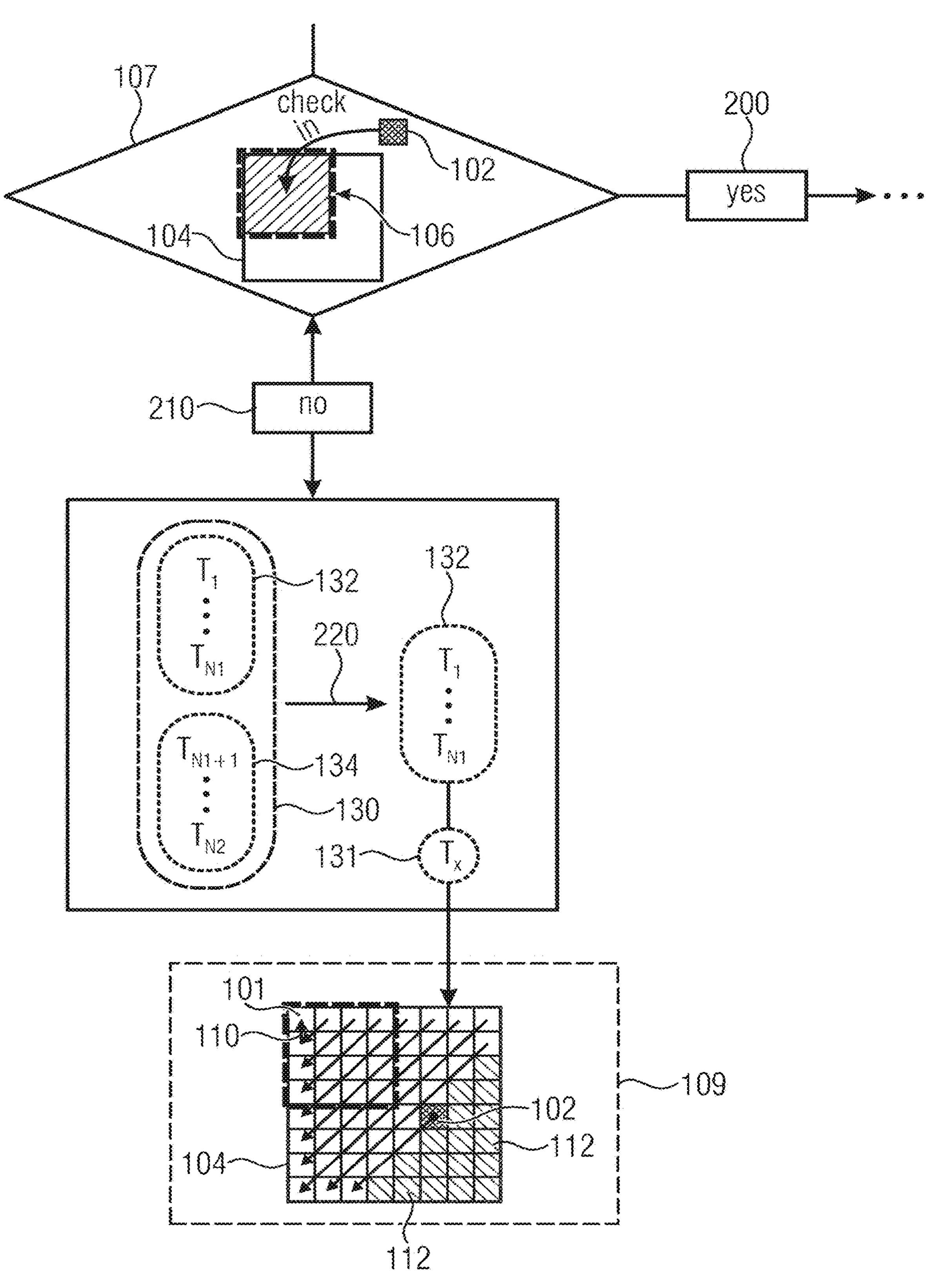
FIG. 8 shows a selection of a transform underlying a transform coefficient block in case of a first coded coefficient position being located outside a predetermined subarea, according to an embodiment.

According to an embodiment, the check 107, whether the first coded coefficient position 102 is located within the predetermined subarea 106 of the transform coefficient block 104 can result in realizing that the first coded coefficient position 102 is not located within the predetermined subarea 106. Such a negative case 210 is shown in FIG. 8. The positive case 200 of realizing that the first coded coefficient position 102 is located within the predetermined subarea 106 is only indicated in FIG. 8 by three dots, since the positive case is already described with regard to FIG. 7.

If the first coded coefficient position 102 is located outside the predetermined subarea 106 of the transform coefficient block 104, the decoder 20 is configured to reduce 220 the set 130 of available transforms to the first set 132 of one or more available transforms by removing from the set 130 of available transforms the second set 134 of one or more available transforms and determine the transform 131 underlying the transform coefficient block 104 out of the first set 132 of one or more available transforms. This determination might either be performed by using the transformation information 108 transmitted in the data stream 14 or, if the first set 132 of one or more available transforms consists of only one transform, by inferring that the transform 131 underlying the transform coefficient block 104 is the one transform. Additionally, the decoder 20 is configured to decode 109 the values of the transform coefficients of the transform coefficient block 104 which are, along the first coefficient scan order 110, located from the first coded coefficient position 102 onwards to a last scanned position 101, and infer that the transform coefficients 112 of the transform coefficient block 104 which are, along the first coefficient scan order 110, located upstream the first coded coefficient position 102 are zero. As shown in FIG. 8, the decoder 20 might be configured to infer that all transform coefficients 112 in the shaded area of the transform coefficient block 104 are zero.

The features and/or functionalities described with regard to FIG. 8 are optional for the decoder 20 of FIG. 7.

Figure 9:
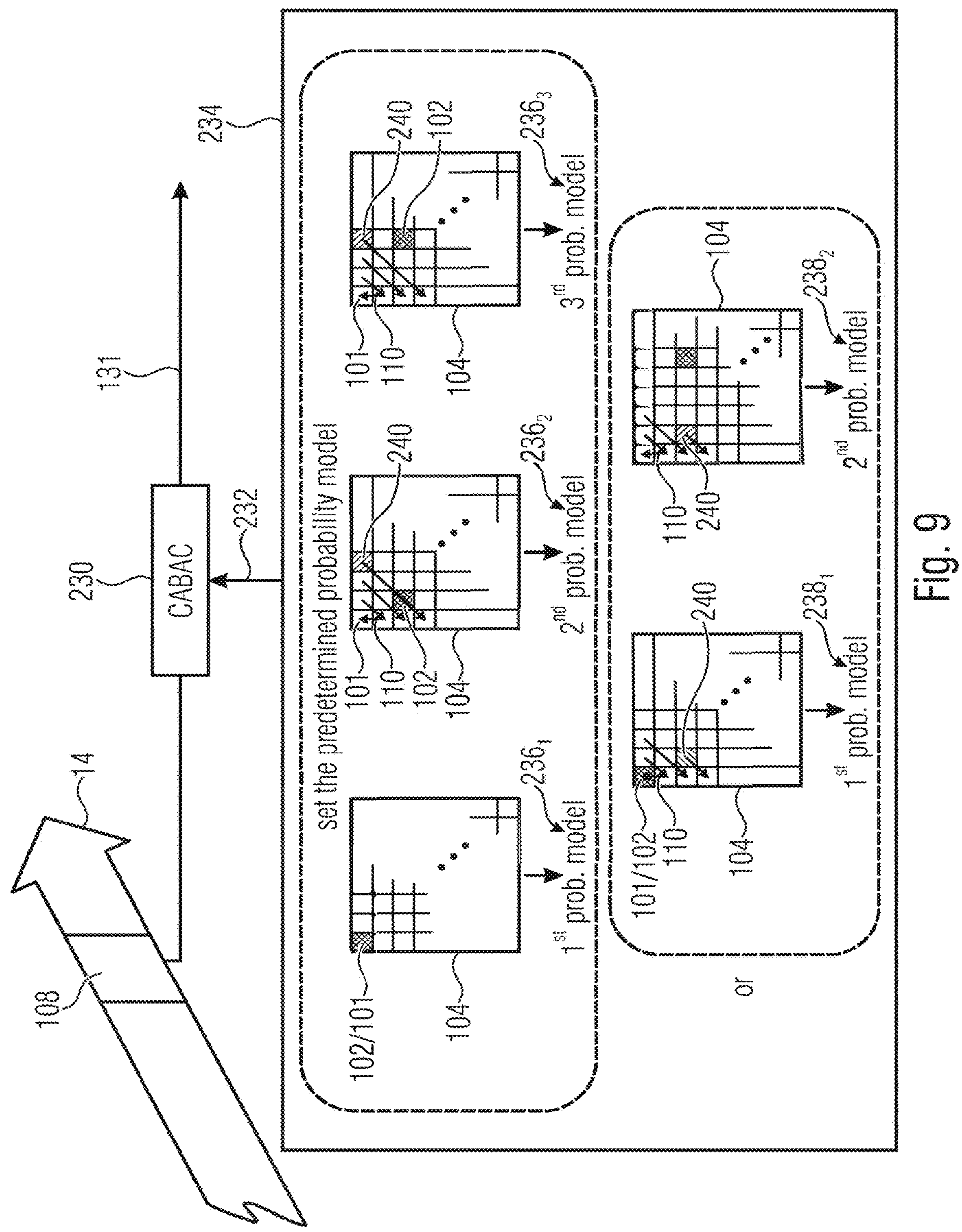
FIG. 9 shows a CABAC coding of transformation information, according to an embodiment.

According to an embodiment, the decoder 20 shown in FIG. 7 is configured to decode the transformation information 108 from the data stream 14 using context-adaptive entropy decoding 230, e.g., context adaptive binary arithmetic coding, as shown in FIG. 9. The decoder 20 might use a predetermined probability model 232, e.g., an estimated probability for a certain binary value as updated for a certain context. The decoder might be configured to determine 234 the predetermined probability model 232 depending on where the first coded coefficient position 102 is located within the transform coefficient block 104, see FIG. 9 and FIG. 10 with the respective description.

According to an embodiment, e.g., a first embodiment, shown in FIG. 9, the decoder 20 is configured to, in determining 234 the predetermined probability model 232 depending on where the first coded coefficient position 102 is located within the transform coefficient block 104, set the predetermined probability model 232 to a first probability model $\mathbf{236}_1$, if the first coded coefficient position 102 coincides with the last scanned position 101, set the predetermined probability model 232 to a second probability model $\mathbf{236}_2$, if the first coded coefficient position 102 is, along the first coefficient scan order 110, no more than a predetermined number 240 of transform coefficients away from the last scanned position 101, and set the predetermined probability model 232 to a third probability model $\mathbf{236}_3$, if the first coded coefficient position 102 is, along the first coefficient scan order 110, more than the predetermined number 240 of transform coefficients away from the last scanned position 101. The predetermined number 240 for this embodiment can be set to ten transform coefficients and the last possible transform coefficient which is, along the first coefficient scan order 110, no more than the predetermined number 240 of transform coefficients away from the last scanned position 101, is indicated by the reference sign 240. However, it is clear that also a different predetermined number 240 of transform coefficients can be chosen.

According to an alternative embodiment, e.g., a second embodiment, shown in FIG. 9, the decoder 20 is configured to, in determining 234 the predetermined probability model 232 depending on where the first coded coefficient position 102 is located within the transform coefficient block 104, set the predetermined probability model 232 to a first probability model $\mathbf{238}_1$, if the first coded coefficient position 102 is, along the first coefficient scan order 110, no more than a predetermined number 240 of transform coefficients away from, or coincides with the last scanned position 101, and set the predetermined probability model 232 to a second probability model $238_2$, if the first coded transform coefficient position 102 is, along the first coefficient scan order 110, more than the predetermined number 240 of coefficients away from the last scanned position 101. The predetermined number 240 for this embodiment can be set to eight transform coefficients and the last possible transform coefficient which is, along the first coefficient scan order 110, no more than the predetermined number 240 of transform coefficients away from the last scanned position 101, is indicated by the reference sign 240. However, as already described above, it is clear that also a different predetermined number 240 of transform coefficients can be chosen.

For both embodiments described above, the first and second coefficient scan orders 110 and 114 coincide in the last scanned position 101 and the predetermined number 240 of transform coefficients upstream the last scanned position 101. In case of superimposing the first and second coefficient scan orders 110 and 114, shown in FIG. 7 (see the decoding 109 for the first coefficient scan order 110 and see the decoding 113 for the second coefficient scan order 114), there exist transform coefficients up to which both scans are the same upstream the last scanned position 101. In case of the transform coefficient blocks 104 shown in FIG. 7, there exist ten transform coefficients up to which both scans are the same upstream the last scanned position 101. The predetermined number 240 of transform coefficients might be set to a number in the range of three transform coefficients to the maximum number of transform coefficients up to which the first and second coefficient scan orders 110 and 114 coincide upstream the last scanned position 101. The predetermined number 240 of transform coefficients might be set to a number in the range of three to ten transform coefficient or three to nine transform coefficient, like eight transform coefficients.

It is to be noted that the first probability model $236_1$ and the second probability model $236_2$ of the above described first embodiment might be different to the first probability model $238_1$ and the second probability model $238_2$ of the above described second embodiment.

Figure 10:
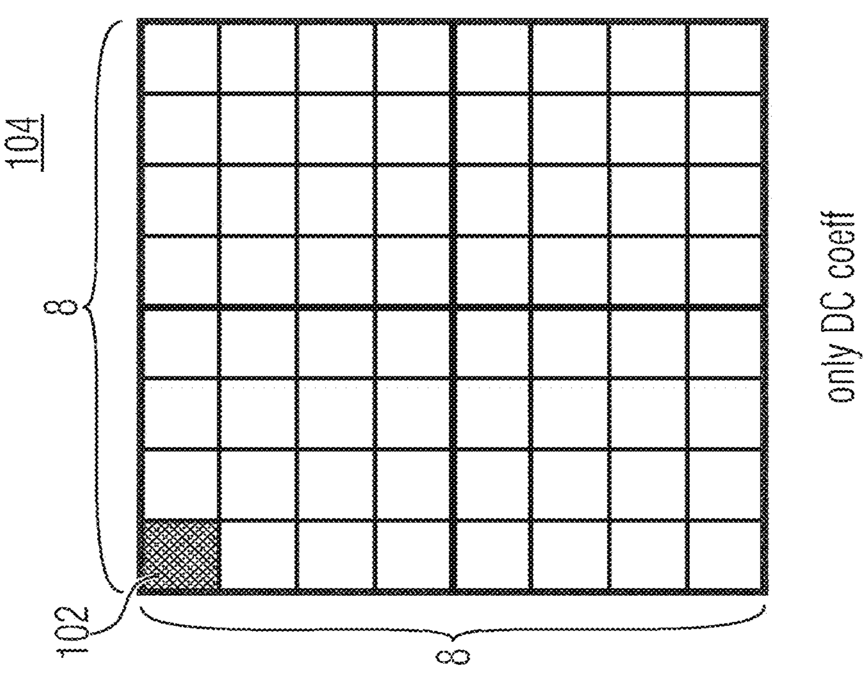
FIG. 10 shows transform coefficient blocks with different number of non-zero transform coefficients, according to an embodiment.
Figure 10:
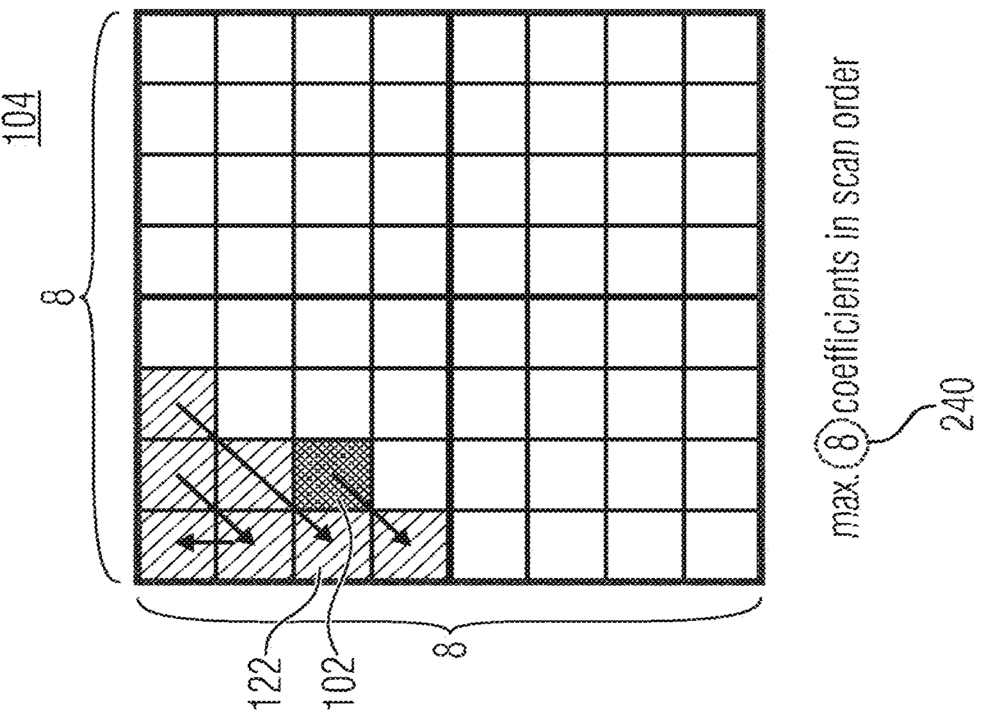

FIG. 10 shows on the left-hand side a transform coefficient block coefficient 104 for which transform coefficient block 104 the predetermined number 240 is set to eight transform coefficients and for which transform coefficient block 104 the first coded transform coefficient position 102 equals the eighths transform coefficient. Additionally, FIG. 10 shows on the right-hand side a transform coefficient block 104 with the first coded transform coefficient position 102 being equal to the aforementioned last scanned position 101.

Figure 11B:
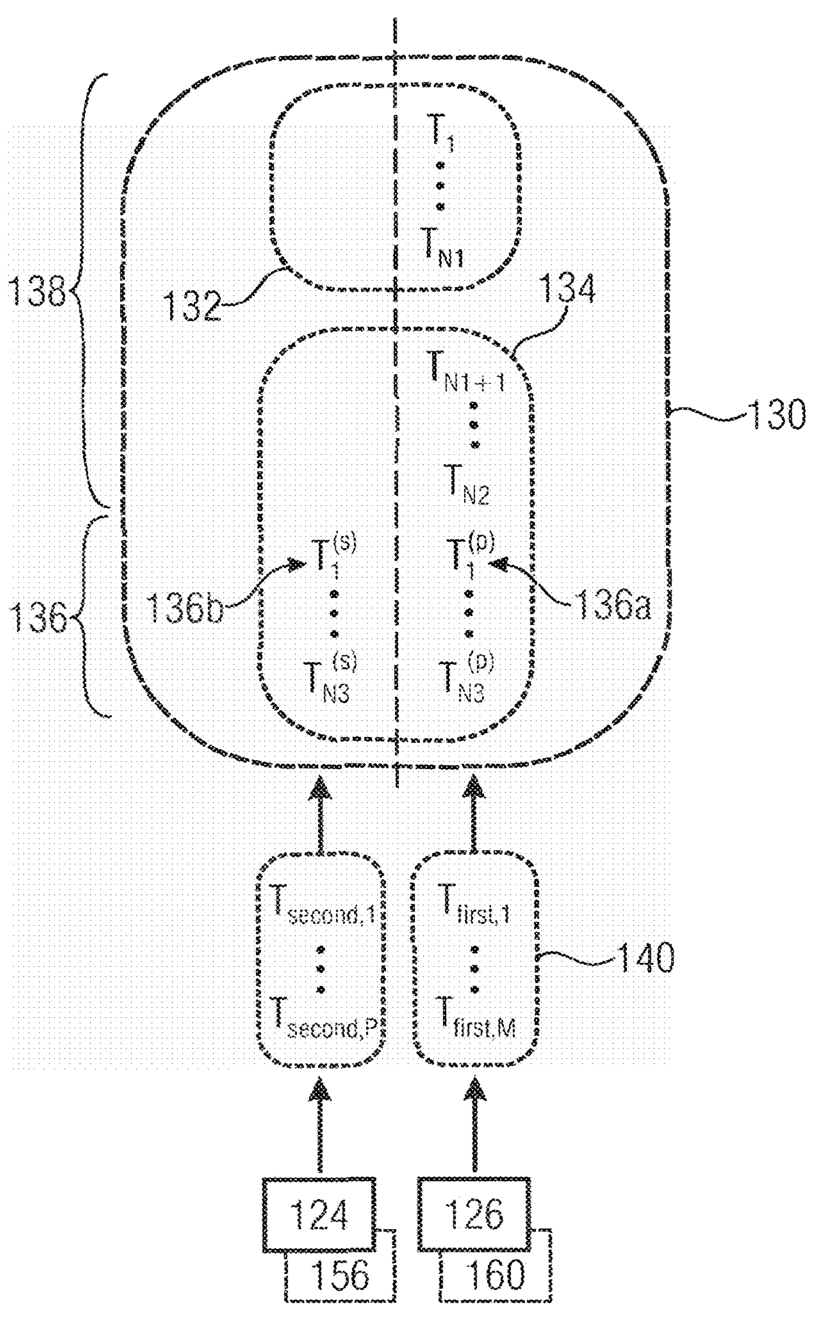
FIG. 11*b* shows a set of available transforms, according to a second embodiment.

According to an embodiment, shown in FIGS. 11*a* and 11*b*, the set 130 of available transforms, shown and described with regard to FIG. 7, comprises one or more multi-stage transforms 136 which correspond to a concatenation of a primary transform 136*a* and a secondary transform 136*b* within the predetermined subarea 106 and consist of the primary transform 136*a* outside the predetermined subarea 106. In other words, at a forward transform, e.g. performed by an encoder, the primary transform 136*a* is applied to the whole sample block 84, i.e. within the predetermined subarea 106 and outside the predetermined subarea 106, to determine a processed coefficient block 84' and the secondary transform is applied only to the predetermined subarea 106 of the processed coefficient block 84' to determine the transform coefficient block 104, as shown on the top right of FIG. 11*a*. At an inverse transform, e.g. performed by the decoder, the inverse of the secondary transform 136*b* is applied to the predetermined subarea 106 of the transform coefficient block 104 to determine the processed coefficient block 84' and the inverse of the primary transform 136*a* is applied to the whole processed coefficient block 84' to determine the sample block 84. Alternatively, as shown on the top left of FIG. 11*a* it is also possible to apply the primary transform and the secondary transform in one transform step, wherein the secondary transform 136*b* is only applied within the predetermined subarea 106 and the primary transform 136*a* is applied within the predetermined subarea 106 and outside the predetermined subarea 106. The one or more multi-stage transforms 136 are contained in the second set 134 of one or more available transforms.

Additionally, the set 130 of available transforms comprises a set 138 of primary-only transforms comprising one or more first primary-only transforms out of which the first set 132 of one or more available transforms consists, and one or more second primary-only transforms which are contained in the second set 134 of one or more available transforms. FIG. 11*a* shows a first set 132 of one or more available transforms consisting of one first primary-only transform $T_0$ and FIG. 11*b* shows a first set 132 of one or more available transforms consisting of $N_1$ first primary-only transforms $T_1$ to $T_{N1}$. The one or more second primary-only transforms in FIG. 11*a* are referenced by $T_1 \ldots T_{N1}$ and the one or more second primary-only transforms in FIG. 11*b* are referenced by $T_{N1+1} \ldots T_{N2}$.

Although the following embodiments are described with regard to FIG. 11*b*, it is clear that it is also possible to use the introduced signaling of the transform 131 underlying the transform coefficient block 104 also for a set 130 as shown in FIG. 11*a*.

According to an embodiment shown in FIG. 11*b*, the decoder is configured to decode a secondary transform indicator 124 from the data stream. The secondary transform indicator 124 indicates whether the transform 131 underlying the transform coefficient block 104 is a multi-stage transform, i.e. a transform within set 136, and which one out of the one or more multi-stage transforms 136, or whether the transform 131 underlying the transform coefficient block 104 is a primary-only transform, i.e. a transform of the set 138. If the secondary transform indicator 124 indicates that the transform 131 underlying the transform coefficient block 104 is a primary-only transform, the decoder is configured to decode a transform indicator 126, e.g. a primary transform indicator, from the data stream which identifies the primary-only transform out of the set 138 of primary-only transforms.

According to an additional or alternative embodiment, shown in FIG. 11*b*, the decoder is configured to decode the secondary transform indicator 124 from the data stream, the secondary transform indicator 124 indicating whether the transform 131 underlying the transform coefficient block 104 is a multi-stage transform 136, and, if yes, the secondary transform 136*b* of the multi-stage transform, i.e. $T^{(s)}$ of the transform 131 underlying the transform coefficient block 104, or whether the transform 131 underlying the transform coefficient block 104 is a primary-only transform, i.e. a transform within set 138. Additionally, the decoder is configured to decode the primary transform indicator 126 from the data stream which identifies, in case of the secondary transform indicator 124 indicating that the transform 131 underlying the transform coefficient block 104 is a primary-only transform, the primary-only transform out of the set 138 of primary-only transforms, i.e. one of set 138, and, in case of the secondary transform indicator 124 indicating that the transform 131 underlying the transform coefficient block

104 is a multi-stage transform, i.e. a transform of the set 136, and if the set 136 of one or more multi-stage transforms comprises more than one multi-stage transform with mutually different primary transforms 136*a*, the primary transform 136*a* of the multi-stage transform. Thus, in this case the primary transform indicator 126 is configured to indicate a primary-only transform out of the set 138 of primary-only transforms or to indicate the primary transform 136*a* for a multi-stage transform dependent on what the secondary transform indicator 124 indicates.

According to an additional or alternative embodiment, shown in FIG. 11*b*, the decoder is configured to decode the primary transform indicator 126 from the data stream. The primary transform indicator 126 indicates a first transform out of the set 138 of primary-only transforms including the one or more first primary-only transform $T_1 \ldots T_{N1}$, i.e. a primary transform of the first set 132 of transforms, and the one or more second primary-only transforms $T_{N1+1} \ldots T_{N2}$, i.e. a primary transform of the second set 134 of transforms. If the first transform is one of the first primary-only transforms $T_1 \ldots T_{N1}$, the decoder is configured to decode the secondary transform indicator 124 from the data stream which identifies the transform 131 underlying the transform coefficient block 104 out of a set including the one or more first primary-only transforms $T_1 \ldots T_{N1}$ and the multi-stage transforms 136, e.g. one out of the set 130 of available transforms without the one or more second primary-only transforms $T_{N1+1} \ldots T_{N2}$. Alternatively, in case of the first transform being one of the first primary-only transforms $T_1 \ldots T_{N1}$, the transform 131 underlying the transform coefficient block 104 might be identified out of a set including the one or more first primary-only transforms $T_1 \ldots T_{N1}$ and the one or more primary transforms $T_1^{(p)}$ to $$T_{N_3}^{(p)}$$

of the multi-stage transforms 136, among which set some transforms may be equal to each other. The transform 131 underlying the transform coefficient block 104 is, in case of the first transform being a primary transform of one of the multi-stage transforms, the one multi-stage transform. In case of the first transform being one of the one or more second primary-only transforms $T_{N1+1} \ldots T_{N2}$, the one second primary-only transform indicated by the primary transform indicator 126. Thus, in case of the first transform being one of the one or more first primary-only transforms $T_1 \ldots T_{N1}$, the secondary transform indicator 124 indicates the transform 131 underlying the transform coefficient block 104 and in case of the first transform being one of the one or more second primary-only transforms $T_{N1+1} \ldots T_{N2}$, the primary transform indicator 126 indicates the transform 131 underlying the transform coefficient block 104.

According to an additional or alternative embodiment, shown in FIG. 11*b*, the decoder is configured to decode the primary transform indicator 126 from the data stream. The primary transform indicator 126 indicates a first transform out of a set including the one or more first primary-only transforms $T_1 \ldots T_{N1}$ and the one or more second primary-only transforms $T_{N1+1} \ldots T_{N2}$. If the first transform is a first primary-only transform $T_1 \ldots T_{N1}$ which is equal to a primary transform $T_1^{(p)}$ to $$T_{N_3}^{(p)}$$

of one or more of the multi-stage transforms 136, the decoder is configured to decode the secondary transform indicator 124 from the data stream which identifies the transform 131 underlying the transform coefficient block 104 out of a set including the first primary-only transform and the one or more multi-stage transforms whose primary transform equals the first primary-only transform, e.g., the first primary-only transform indicated by the primary transform indicator 126.

According to an embodiment, the decoder 20 is configured to perform the decoding of the primary transform indicator 126 from the data stream using context-adaptive entropy decoding using a predetermined probability model, and determine the predetermined probability model depending on where the first coded coefficient position 102 is located within the transform coefficient block 104.

According to an embodiment, the decoder 20 is configured to in determining the predetermined probability model depending on where the first coded coefficient position 102 is located within the transform coefficient block 104, set the predetermined probability model to a first probability model, if the first coded coefficient position 102 coincides with the last scanned position 101, set the predetermined probability model to a second probability model, if the first coded coefficient position 102 is, along the first coefficient scan order 110, no more than a predetermined number 240 of transform coefficients 120 away from the last scanned position 101, and set the predetermined probability model to a third probability model, if the first coded coefficient position 102 is, along the first coefficient scan order 110, more than the predetermined number 240 of transform coefficients away from the last scanned position 101.

The first 110 and second 114 coefficient scan orders coincide in the last scanned position 101 and the predetermined number 240 of transform coefficients 120 upstream the last scanned position 101.

According to an alternative embodiment, the decoder 20 is configured to in determining the predetermined probability model depending on where the first coded coefficient position 102 is located within the transform coefficient block 104, set the predetermined probability model to a first probability model, if the first coded coefficient position 102 is, along the first coefficient scan order 110, no more than a predetermined number 240 of transform coefficients away from, or coincides with the last scanned position 101, and set the predetermined probability model to a second probability model, if the first coded transform coefficient position 102 is, along the first coefficient scan order 110, more than the predetermined number 240 of coefficients away from the last scanned position 101.

The first 110 and second 114 coefficient scan orders coincide in the last scanned position 101 and the predetermined number 240 of transform coefficients upstream the last scanned position 101.

The above described setting of the predetermined probability model for the context-adaptive entropy decoding of the primary transform indicator 126 from the data stream might comprise features and/or functionalities as described for the setting of the predetermined probability model 232 for the context-adaptive entropy decoding 230 of the transformation information 108 from the data stream 14, as shown in FIG. 9. The first, the second and the optional third probability models for the context-adaptive entropy decoding of the primary transform indicator 126 might be different to the first, the second and the optional third probability models for the context-adaptive entropy decoding of the transformation information 108.

According to an embodiment, the primary transform is equal for all of the one or more multi-stage transforms 136 and is also equal to one of the one or more first primary-only transforms $T_0$ or $T_1$-$T_{N1}$.

According to an embodiment, there is only one first primary-only transform $T_0$, as shown in FIG. 11*a*.

According to an embodiment, the decoder 20 is configured to subject the transform coefficient block 104 to a reverse transformation, e.g., an inverse transform, which reverses the transform 131 underlying the transform coefficient block 104 so as to obtain the sample block 84.

According to an embodiment, the decoder 20 is configured to use the sample block 84 to correct a prediction signal gained by intra-picture or inter-picture prediction.

Figure 12:
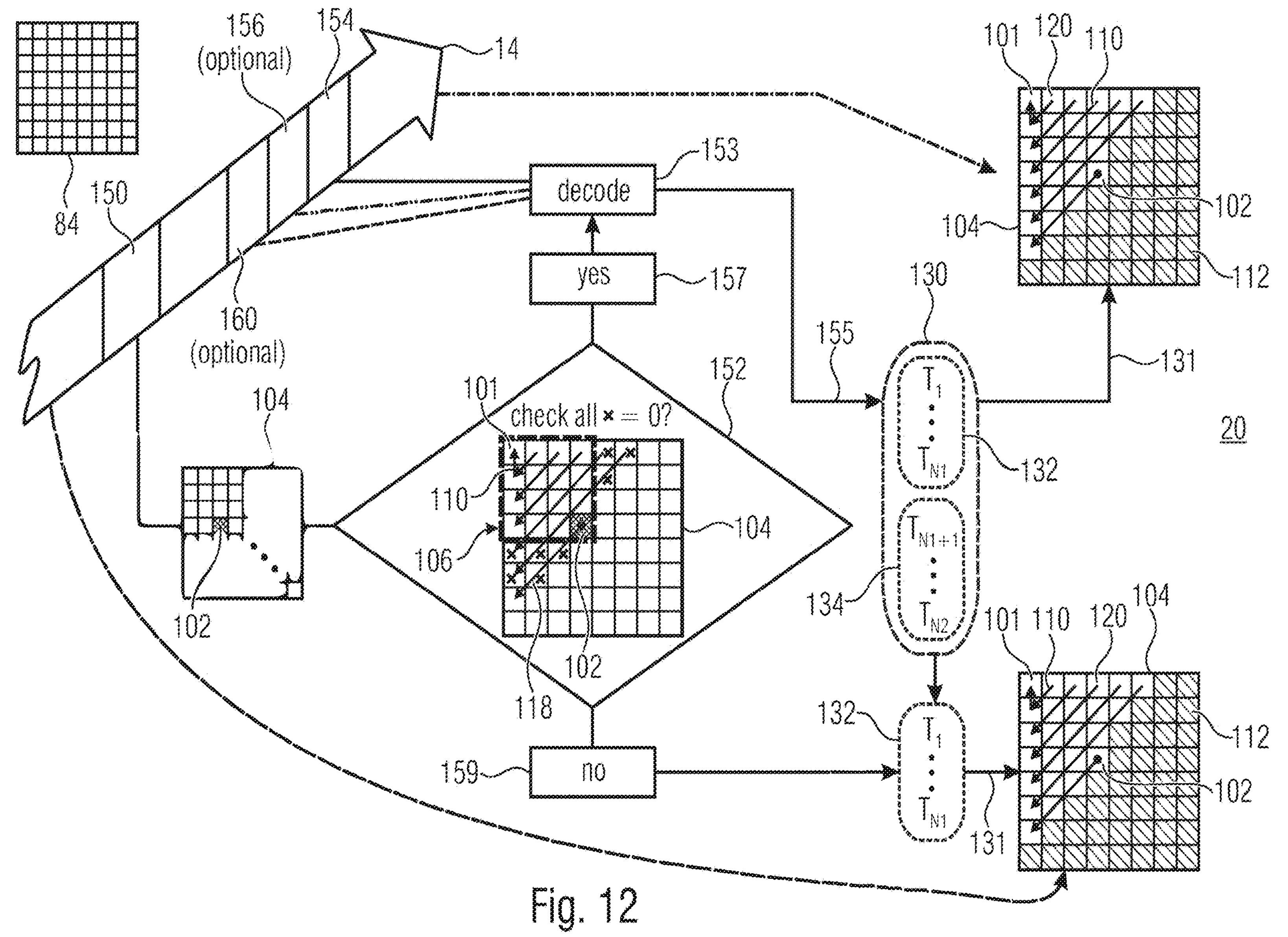
FIG. 12 shows a decoder checking whether transform coefficients outside a predetermined subarea are zero, according to an embodiment.

FIG. 12 shows a decoder 20 for decoding a transformed representation of a sample block 84 from a data stream 14. The decoder 20 is configured to decode a coefficient position information 150 from the data stream 14. The coefficient position information 150 is indicative of a first coded coefficient position 102 within a transform coefficient block 104. The coefficient position information 150 might have the same features and/or functionalities as described with regard to the coefficient position information 100 of the decoder shown in FIG. 7.

The decoder 20 is configured to decode values of transform coefficients 120 of the transform coefficient block 104 which are, along a predetermined coefficient scan order 110, located from the first coded coefficient position 102 onwards to a last scanned position 101, and infer that transform coefficients 112 of the transform coefficient block 104 which are, along the predetermined coefficient scan order 110, located upstream the first coded coefficient position 102 are zero. As shown in FIG. 12, the transform coefficients 112 in the shaded area of the transform coefficient block 104 are inferred to be zero.

The decoder is configured to check 152 whether all transform coefficients 118, i.e. the transform coefficients indicated by the x in FIG. 12, of the transform coefficient block 104 which are, along the predetermined coefficient scan order 110, located from the first coded coefficient position 102 onwards to the last scanned position 101 are, if not located within a predetermined subarea 106 of the transform coefficient block 104, zero. This check is performed in the subsequent explained embodiments in a manner where the coefficients are checked for their zeroness individually based on the corresponding significance flags, for instance. However, alternatives exist. For instance, it might be that this check 152 might be performed subblock-wise and that the predetermined subarea 106 encompasses all subblocks except some subblocks of lowest spectral components, e.g. the n×m subblocks at the upper left corner of block 104 which contain the DC subblock comprising the DC coefficient, as well as the subblock containing the last scanned position 101. n might be equal to m, for instance. n might be 4 and m might be 4, for instance. To be more precise, the transform coefficient block might be subdivided into subblocks with each subblock, for example, being 4×4 transform coefficients large, so that the upper left subblock is the subblock of lowest spectral components. Each subblock, for example, can be indicated by an index or by coordinates, e.g. xS and yS, defining the position of the respective subblock in the transform coefficient block 104, wherein xS indicates the subblock column and yS the subblock row of the respective subblock with the indexing starting at zero, respectively, i.e. subblock (xS,yS)=(0,0) being the DC subblock. The predetermined coefficient scan order 110 may traverse the coefficients of block 104 subblockwise, i.e. all coefficients within a subblock are traversed before proceeding to the next subblock. The subblocks might be traversed in a manner similar to the scan within each subblock, namely diagonally. For each subblock except the subblock of lowest spectral components as well as the subblock containing the last scanned position 101, a subblock flag may be transmitted in the data stream, i.e. decoded by decoder and encoded thereinto by the encoder, the subblock indicating for the respective subblock whether any significant coefficient is contained within the respective subblock. The decoder might check based on these subblock flags whether significant values are present in any subblock outside the predetermined area, i.e. within any subblock between the n×n lowest spectral-component subblocks and the subblock containing the last coded coefficient. By this measure, it is tested, whether all transform coefficients 118 of the transform coefficient block 104 which are, along the predetermined coefficient scan order 110, located from the first coded coefficient position 102 onwards to the last scanned position 101 are, if not located within the predetermined subarea 106 of the transform coefficient block 104, zero, namely in case of all coded subblock flags for subblocks between the n×n subblocks and the subblock containing the last coded coefficient being zero. For example, in case of the predetermined area being 16×16 transform coefficients large, i.e. 4 subblocks in width and 4 subblocks in height, it is checked 152 whether a subblock outside the predetermined subarea 106, e.g. a subblock indicated with coordinates xS>3 or yS>3, comprises one or more significant transform coefficients. Let's resume the description.

If all transform coefficients 118 of the transform coefficient block 104 which are, along the predetermined coefficient scan order 110, located from the first coded coefficient position 102 onwards to the last scanned position 101 are, if not located within the predetermined subarea 106 of the transform coefficient block 104, zero, the decoder 20 is configured to decode 153 a transformation information 154 from the data stream 14 and identify 155, using the transformation information 154, a transform 131 underlying the transform coefficient block 104 out of a set 130 of available transforms, e.g. out of a second set 134 of one or more available transforms out of the set 130 of available transforms.

If not all transform coefficients 118 of the transform coefficient block 104 which are, along the predetermined coefficient scan order 110, located from the first coded coefficient position 102 onwards to the last scanned position 101 are, if not located within the predetermined subarea 106 of the transform coefficient block 104, zero, the decoder is configured to reduce the set 130 of available transforms to a first set 132 of one or more available transforms by removing from the set 130 of available transforms the second set 134 of one or more available transforms and determine the transform 131 underlying the transform coefficient block 104 out of the first set 132 of one or more available transforms. This can also be described in the following way: If a subblock is located outside the predetermined area, e.g., the top-left 16×16 coefficients, and it is significant, that is, for example, the respective subblock contains at least one non-zero coefficient, then it follows that only a restricted set of transforms, e.g. only the transforms of the first set 132 of one or more available transforms, can be utilized. If this set 132 contains only one transform, for example, only the DCT-II, then the value of mts_idx can be inferred to be 0.

According to an embodiment, the set 130 of available transforms might be a set 138 of primary-only transforms as, for example, shown in FIG. 11*a* or 11*b*, including one or more first primary-only transform $T_1 \ldots T_{N1}$, e.g., comprised in the first set 132 of one or more available transforms, and one or more second primary-only transforms $T_{N1+1} \ldots T_{N2}$, e.g., comprised in the second set 134 of one or more available transforms. Preferably the set 130 of available transforms consists of one first primary-only transform $T_0$ and one or more second primary-only transforms $T_1 \ldots T_N$ as, for example, shown in FIG. 11*a*. Thus, in the second case of not all transform coefficients 118, indicated by the x in FIG. 12, of the transform coefficient block 104 outside the predetermined subarea 106 of the transform coefficient block 104 being zero, the decoder might determine the one first primary-only transform $T_0$ as the transform 131 underlying the transform coefficient block 104. In the other case of all transform coefficients 118, indicated by the x in FIG. 12, of the transform coefficient block 104 outside the predetermined subarea 106 of the transform coefficient block 104 being zero, the decoder might determine the transform 131 underlying the transform coefficient block 104 out of set 130 by way of an index transmitted in the data stream for block 104, i.e. decoded from the data stream by the decoder and encoded thereinto by the encoder in this other case. The set 130 of available transforms might comprise five different options, the one transform $T_0$ might be a DCTII-DCTII transformation. The latter example might be combined, for instance, with the aforementioned example of checking the zeroness outside the predetermined area subblockwise. Additionally, in this example, it might optionally be that coding options for block 104 exist according to which the transform 131 underlying block 104 is a combination of the primary transform determined as just-outlined with a secondary transform. For instance, it might be that, if the position of the last coded transform coefficient fulfills a certain condition, that a further index selects a secondary transform out of a set of secondary transforms. This set might comprise, as one option, no secondary transform, i.e. an identity transform effectively leaving the primary transform as primary only transform. If the certain condition is not met, no secondary transform would be used, too.

The transform 131 underlying the transform coefficient block 104 along with the transform coefficient block 104 defines the transformed representation and the predetermined coefficient scan order 110 scans the transform coefficients 120 in a manner so that there are one or more transform coefficients 118, i.e. the transform coefficients indicated by the x, outside the predetermined subarea 106 which are scanned by the predetermined coefficient scan order 110 between two transform coefficients 120 located inside the predetermined subarea 106.

According to an embodiment, the decoder is configured to check whether the first coded coefficient position 102 is located within the predetermined subarea 106 of the transform coefficient block 104, and check 152 whether all transform coefficients 118 which are located outside the predetermined subarea 106 of the transform coefficient block 104 and are, along the predetermined coefficient scan order 110, located from the first coded coefficient position 102 onwards to the last scanned position 101 are zero. Optionally, the check 152 is merely performed if the first coded coefficient position 102 is located within the predetermined subarea 106 of the transform coefficient block 104. This is due to the fact, that the transform coefficients outside the predetermined subarea 106 should not be zero in case of the first coded coefficient position 102 being located outside the predetermined subarea 106 of the transform coefficient block 104.

According to an embodiment, the decoder 20 is configured to perform the decoding 153 of the transformation information 154 from the data stream 14 using context-adaptive entropy decoding using a predetermined probability model, and determine the predetermined probability model depending on where the first coded coefficient position 102 is located within the transform coefficient block 104. Optionally, the predetermined probability model for the context-adaptive entropy decoding of the transformation information 154 from the data stream 14 might be set as described with regard to the predetermined probability model 232 for the context-adaptive entropy decoding 230 of the transformation information 108 from the data stream, as shown in FIG. 9. However, it is clear that the first, the second and the optional third probability models for the context-adaptive entropy decoding of the transformation information 154 might be different to the first, the second and the optional third probability models for the context-adaptive entropy decoding of the transformation information 108.

According to an embodiment, the set 130 of available transforms comprises, as shown in FIG. 11*a*, multi-stage transforms 136 each of which corresponds to a concatenation of a primary transform $$T_1^{(p)} - T_{N2}^{(p)}$$

and a secondary transform $$T_1^{(s)} - T_{N2}^{(s)}$$

within the predetermined subarea 106 and consists of the primary transform $$T_1^{(p)} - T_{N2}^{(p)}$$

outside the predetermined subarea 106. The multi-stage transforms 136 are contained in the second set 134 of one or more available transforms. A set 138 of primary-only transforms comprising a first primary-only transform $T_0$ out of which the first set 132 of one or more available transforms consists, and to which the primary transform $$T_1^{(p)} - T_{N2}^{(p)}$$

for all of the one or more multi-stage transforms 136 is equal, and one or more second primary-only transforms $T_1$-$T_{N1}$ which are contained in the second set 134 of one or more available transforms.

According to an embodiment, the set 130 of available transforms described above and shown in FIG. 11*a* is used. The decoder 20 is configured to, if all transform coefficients 118 of the transform coefficient block 104 which are, along the predetermined coefficient scan order 110, located from the first coded coefficient position 102 onwards to the last scanned position 101 are, if not located within the predetermined subarea 106 of the transform coefficient block 104, zero, decode a secondary transform indicator 156 from the data stream 14, the secondary transform indicator 156 indicating whether the transform 131 underlying the transform coefficient block 104 is a multi-stage transform 136, and which one out of the one or more multi-stage transforms 136, or whether the transform 131 underlying the transform coefficient block 104 is a primary-only transform 138. In other words, the secondary transform indicator 156 indicates whether the transform 131 underlying the transform coefficient block 104 belongs to the multi-stage transforms 136 or to the primary-only transforms 138, wherein the transform 131 underlying the transform coefficient block 104 is directly indicated by the secondary transform indicator 156, if the transform 131 belongs to the multi-stage transforms 136. Additionally, it is in this first case 157 checked whether the secondary transform indicator 156 indicates that the transform 131 underlying the transform coefficient block 104 is a primary-only transform 138, and if the secondary transform indicator 156 indicates that the transform 131 underlying the transform coefficient block 104 is a primary-only transform 138, the decoder 20 is configured to decode a transform indicator 160, e.g., a primary transform indicator, from the data stream 14 which identifies the primary-only transform out of the set 138 of primary-only transforms. In the second case 159, if not all transform coefficients 118 of the transform coefficient block 104 which are, along the predetermined coefficient scan order 110, located from the first coded coefficient position 102 onwards to the last scanned position 101 are, if not located within the predetermined subarea 106 of the transform coefficient block 104, zero, the transform underlying the transform coefficient block is the first primary-only transform $T_0$.

According to an embodiment, the set 130 of available transforms described above and shown in FIG. 11*a* is used. The decoder 20 is configured to, if all transform coefficients 118 of the transform coefficient block 104 which are, along the predetermined coefficient scan order 110, located from the first coded coefficient position 102 onwards to the last scanned position 101 are, if not located within the predetermined subarea 106 of the transform coefficient block 104, zero, decode the primary transform indicator 160 from the data stream 14, the primary transform indicator 160 indicating a first transform out of a set including the first primary-only transform $T_0$ and the one or more second primary-only transforms $T_1$-$T_{N1}$. If the first transform is the first primary-only transform $T_0$, the decoder 20 is configured to decode the secondary transform indicator 156 from the data stream 14 which identifies the transform 131 underlying the transform coefficient block 104 out of a set including the first primary-only transform $T_0$ and the multi-stage transforms 136. If the first transform is one of the one or more second primary-only transforms $T_1$-$T_{N1}$, the transform 131 underlying the transform coefficient block 104 is the one second primary-only transform, i.e., the second primary-only transform indicated by the primary transform indicator 160. If not all transform coefficients 118 of the transform coefficient block 104 which are, along the predetermined coefficient scan order 110, located from the first coded coefficient position 102 onwards to the last scanned position 101 are, if not located within the predetermined subarea 106 of the transform coefficient block 104, zero, the transform 131 underlying the transform coefficient block 104 is the first primary-only transform $T_0$.

According to an embodiment, the primary transform $$T_1^{(p)} - T_{N2}^{(p)}$$

is equal for all of the one or more multi-stage transforms 136 and is also equal to one of the one or more first primary-only transforms, e.g., equal to $T_0$ in FIG. 11*a* or equal to one of $T_1$-$T_{N1}$ in FIG. 11*b*.

According to an embodiment, there is only one first primary-only transform $T_0$, as shown in FIG. 11*a*.

According to an embodiment, the decoder 20 is configured to subject the transform coefficient block 104 to a reverse transformation which reverses the transform 131 underlying the transform coefficient block 104 so as to obtain the sample block 84.

According to an embodiment, the decoder 20 is configured to use the sample block 84 to correct a prediction signal gained by intra-picture or inter-picture prediction.

According to an embodiment, an encoder with parallel features and/or functionalities as one of the decoders described above with respect to one of FIGS. 7 to 12 is configured to subject the sample block 84 to the transform 131 underlying the transform coefficient block 104 so as to obtain the transform coefficient block 104.

According to an embodiment, an encoder with parallel features and/or functionalities as one of the decoders described above with respect to one of FIGS. 7 to 12 is configured to derive a prediction residual of a prediction signal gained by intra-picture or inter-picture prediction and determine the sample block 84, e.g., including a quantization, to represent the prediction residual.

The following description describes in other words the two ways described above to improve the coding efficiency for transform type signaling:

1. KEEP SIGNALING TRANSFORM TYPE AFTER THE COEFFICIENT LEVELS IN SUBBLOCKS

When the first (last) significant coefficient position 102 in the current transform block 104 is located inside an area where all coefficients are required to be equal to 0 for a certain subset of allowed transforms, i.e. the first (last) significant coefficient position 102 is located outside the predetermined subarea 106 (e.g. outside the 16×16 area for non-DCT-II transforms described above), only the subset of allowed transforms can be signaled that does not have the non-zero requirement, e.g. the transforms of the first set 132 of available transforms of the set 130 of available transforms. In case the subset contains only one transform, no signaling is needed and the transform is inferred (e.g. MTS index is not signaled and inferred to be equal to 0 instead which is illustrated in both simplified syntax diagrams of FIG. 13)

Figure 13:
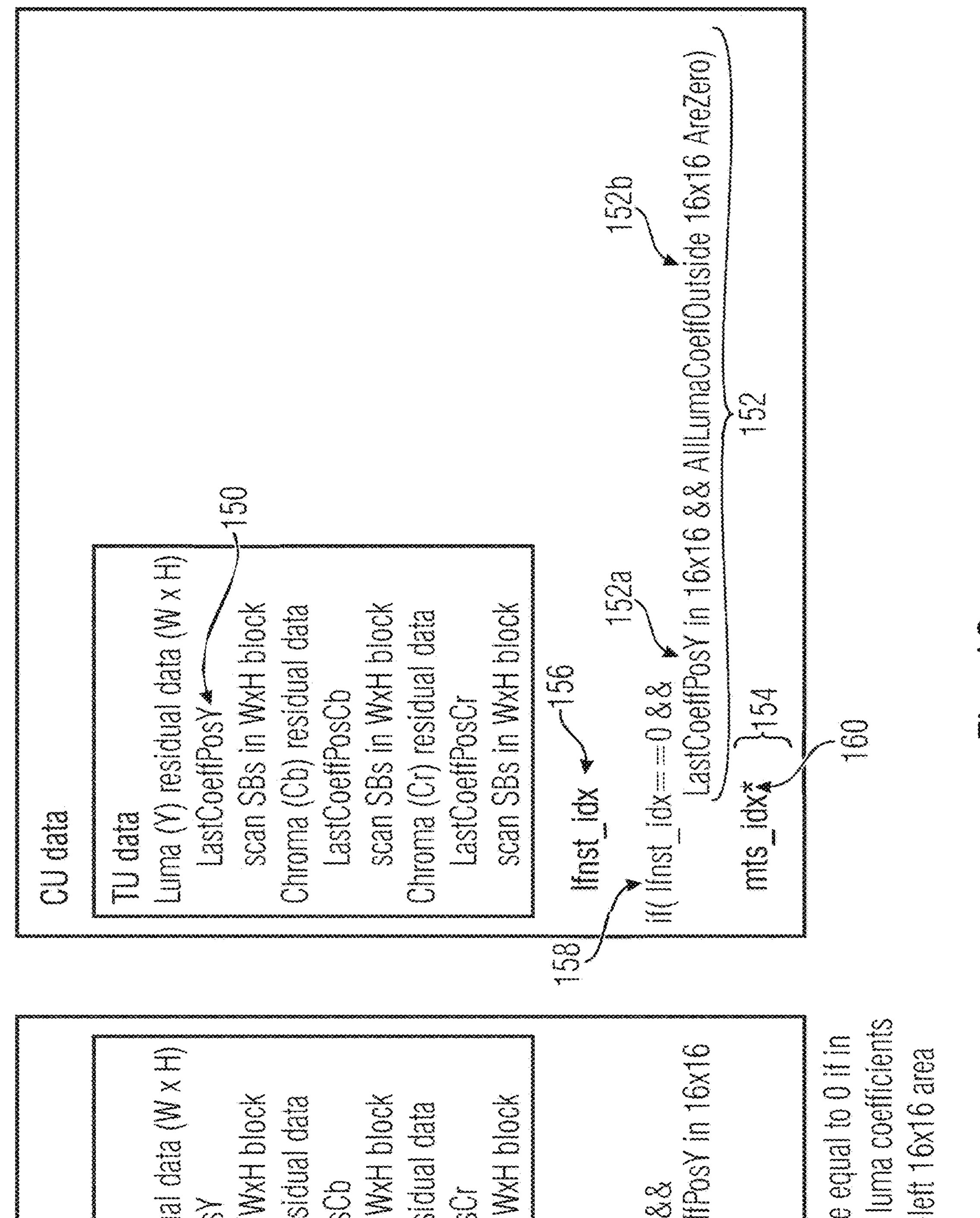
FIG. 13 shows a first simplified syntax diagram.

FIG. 13 shows a simplified syntax diagram with non-modified subblock (SB) scanning depending on transform selection with mts_idx.

When the first (last) significant coefficient position 102 in the current transform block 104 is located outside an area where all coefficients are required to be equal to 0 for a certain subset of allowed transforms, i.e. the first (last) significant coefficient position 102 is located inside the predetermined subarea 106 (e.g. inside the 16×16 area for non-DCT-II transforms described above), the location of each subsequentially scanned coefficient is checked 152, as shown in FIG. 12. If at least one coefficient 118 is located outside the non-zero area, i.e. the predetermined subarea 106, only the subset of allowed transforms can be signaled that does not have the non-zero requirement, e.g. the transforms of the first set 132 of available transforms of the set 130 of available transforms. In case the subset contains only one transform, no signaling is needed and the transform is inferred (e.g. MTS index is not signaled and inferred to be equal to 0 instead). This condition is illustrated in the simplified syntax diagram on the right-hand side of FIG. 13 (see condition on AllLumaCoeffOutside16×16AreZero).

In case an additional transform can be applied, e.g., an LFNST, its selection is signaled 156 before the transform type and it indicates that the additional transform is applied, only the subset of transforms that are allowed in combination with the additional transform can be signaled. In case the subset contains only one transform, no signaling is needed and the transform is inferred (e.g. if LFNST index is greater than 0, which signals that an LFNST is applied, the MTS index is not signaled and inferred to be equal to 0 instead, which corresponds to the DCT-II, illustrated in both simplified syntax diagrams of FIG. 13).

In case an additional transform can be applied (e.g. an LFNST), its selection is signaled 156 after the transform type and the transform type indicates a transform that is not allowed to be combined with the additional transform, the selection of the additional transform is not signaled but inferred to be disabled (e.g. if MTS index is greater than 0, which signals that a non-DCT-II transform is applied, the LFNST index is not signaled and inferred to be equal to 0 instead, which corresponds to disabling the LFNST).

2. SIGNAL TRANSFORM TYPE AFTER FIRST (LAST) SIGNIFICANT COEFFICIENT POSITION AND BEFORE THE COEFFICIENT LEVEL IN SUBBLOCKS

After the first (last) significant coefficient position 102 in the current transform block 104 is signaled 100 and it is located inside an area where all coefficients are required to be equal to 0 for a certain subset of allowed transforms, i.e. the first (last) significant coefficient position 102 is located outside the predetermined subarea 106 (e.g. outside the 16×16 area for non-DCT-II transforms described above), only the subset of allowed transforms can be signaled that does not have the non-zero requirement, e.g. the transforms of the first set 132 of available transforms of the set 130 of available transforms, as shown in FIG. 8. In case the subset contains only one transform, no signaling is needed and the transform is inferred (e.g. MTS index is not signaled and inferred to be equal to 0 instead). This condition is illustrated in both simplified syntax diagrams in FIG. 14 (see condition on LastCoeffPosY in 16×16).

Figure 14:
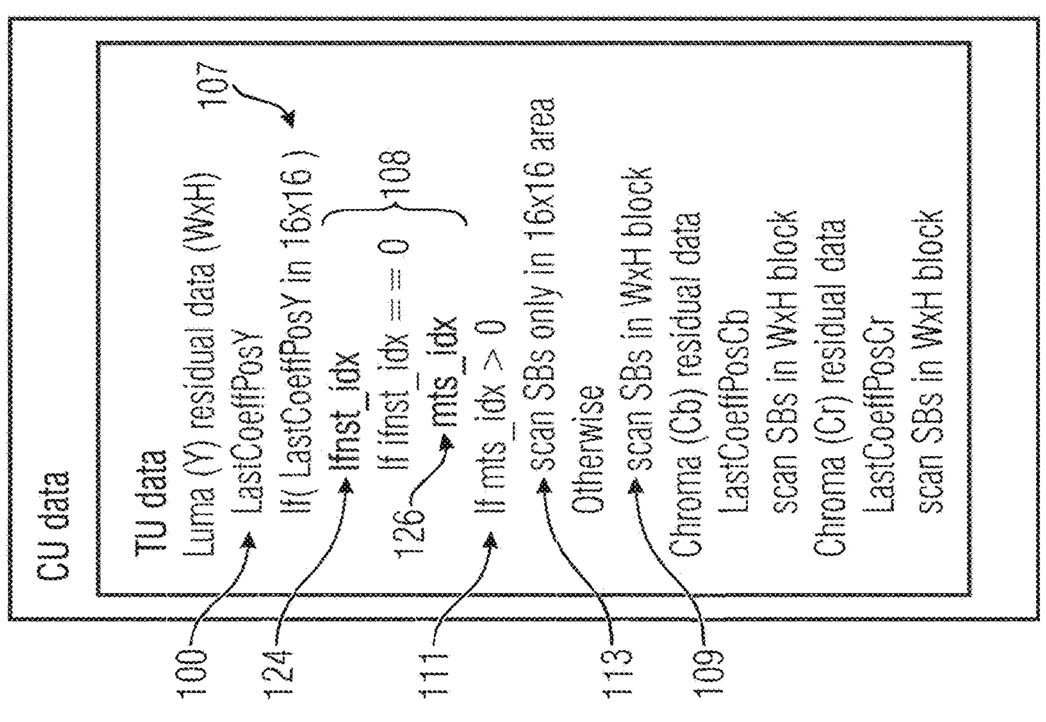
FIG. 14 shows a second simplified syntax diagram.
Figure 14:
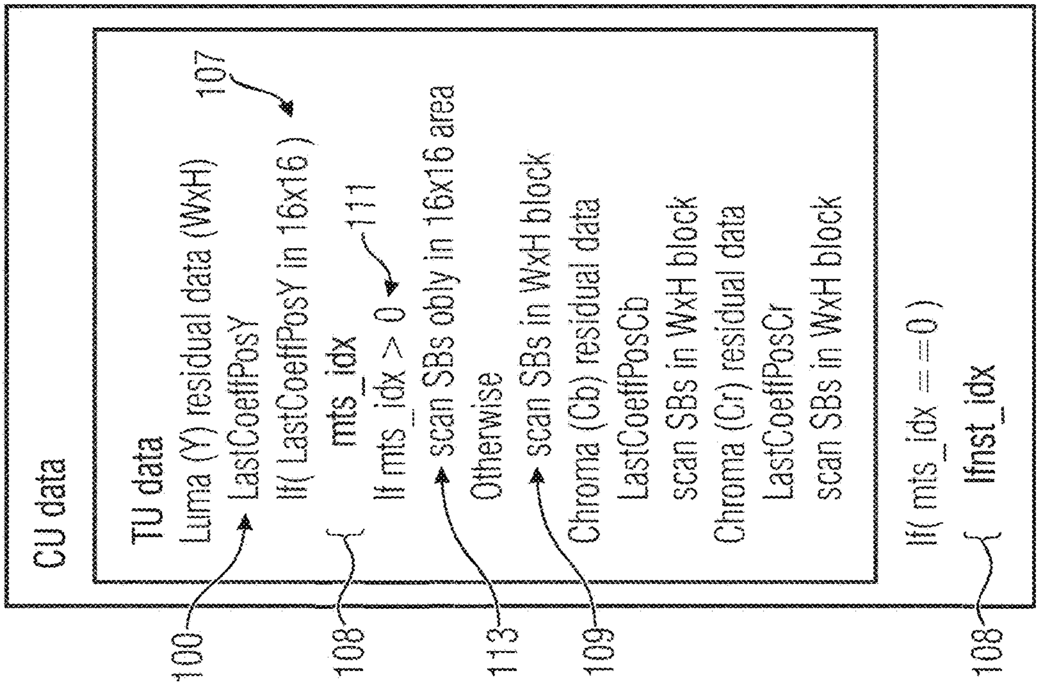

FIG. 14 shows a simplified syntax diagram with modified subblock (SB) scanning depending on transform selection with mts_idx.

Figure 3:
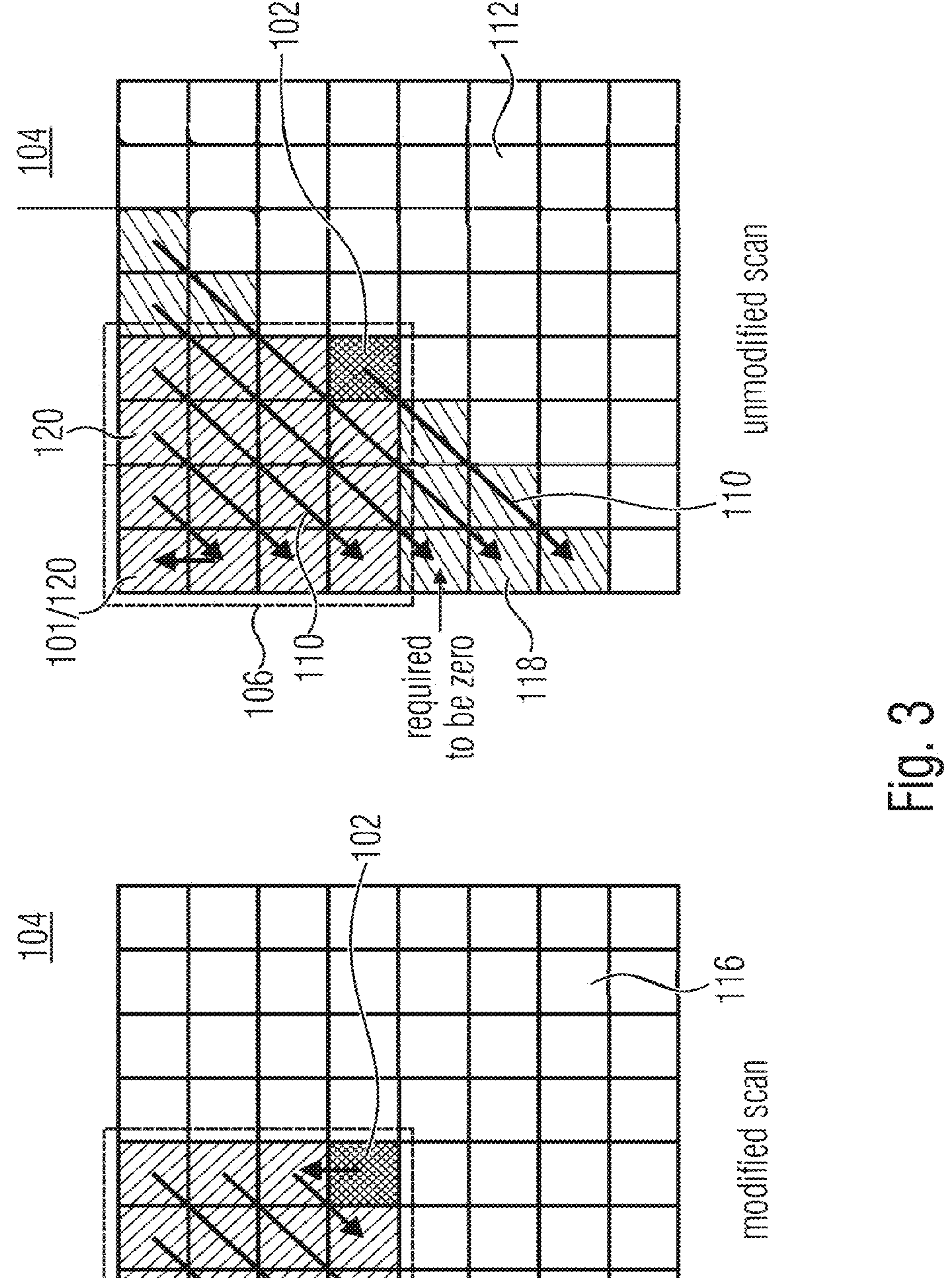
FIG. 3 shows an unmodified scan of a transform block, according to a current design, and a modified scan of a transform block, according to an embodiment.

When a transform is signaled that requires all coefficients outside a specific area, i.e. the predetermined subarea 106, to be equal to 0, change the scanning order in a way that only subblocks and coefficients inside this area, i.e. the predetermined subarea 106, are in the scanning path 114 as shown in the left-hand side of FIG. 3 or as shown in FIG. 7. This condition is also illustrated in both simplified syntax diagrams in FIG. 14 (see condition on mts_idx>0).

In case an additional transform can be applied, e.g., an LFNST, its selection 124 is signaled after the transform type and the transform type indicates a transform that is not allowed to be combined with the additional transform, e.g., a transform of the second primary-only transforms, the selection of the additional transform is not signaled but inferred to be disabled (e.g. if MTS index is greater than 0, which signals that a non-DCT-II transform is applied, the LFNST index is not signaled and inferred to be equal to 0 instead, which corresponds to disabling the LFNST, illustrated in the simplified syntax diagram on the left-hand side of FIG. 14).

In addition to the previous case, the signaling of the transform type can be done using context-adaptive entropy coding 230, e.g. context-adaptive binary arithmetic coding (CABAC), as shown in FIG. 9. In this case, the context selection might depend on conditions that allow applying an additional transform (e.g. LFNST) or not. This can be the number 240 of non-zero coefficients in the current block, i.e. the current transform coefficient block 104, inferred from the first (last) significant coefficient position 102. If applying an additional transform to the DC coefficient, i.e. the last scanned position 101, i.e. the top-left (0,0) zero-frequency position, would result in the same DC coefficient, it would make no sense to apply and signal such an additional transform if only one DC coefficient is present in the current transform block, i.e. in case the first coded coefficient position 102 coincides with the last scanned position 101. Hence, if the last (first) significant position points to the DC position which is also the first and the last position in scan order, the additional transform does not need to be signaled and a specific context A, e.g., a first probability model, is selected for the MTS index. This case is illustrated on the right-hand side of FIG. 10. Furthermore, to reduce the complexity in terms of number of multiplications, only a certain maximum number 240 of coefficients (e.g. 8) can be allowed from the first (last) significant position 102 to the DC, i.e. the last scanned position 101, for the additional transforms in scan order 110. This case is illustrated on the left-hand side of FIG. 10. All other cases where an additional transform can be applied and/or an indication is signaled, another context B, e.g. a second probability model, is selected. In summary the conditions for context selection based on the previous examples would be:

- If the current transform block 104 has more non-zero coefficients than the DC and there are no more than 8 coefficients in scan order 110 from the last significant position to the DC, select context A, e.g., the second probability model $236_2$.
- Otherwise, select context B.

Another example could have more than 2 context depending on the condition

- If the current transform block 104 has no more non-zero coefficients than the DC, select context A, i.e. the first probability model $236_1$.
- Otherwise, if there are no more than 8 coefficients in scan order from the last significant position to the DC, select context B, i.e. the second probability model $236_2$.
- Otherwise, select context C, i.e. the third probability model $236_3$.

The conditions can also apply to multiple transform blocks, e.g. there have to be more coefficients than the DC for luma and two chroma blocks or for more than one luma block in case the luma transform block is divided into multiple (e.g. 4) transform blocks.

FIG. 10 shows an 8×8 block with four 4×4 subblocks and a maximum of eight non-zero coefficients in scan order (left) or with only one non-zero coefficient at the DC position (right).

In case an additional transform can be applied (e.g. an LFNST), its selection is signaled before the transform type and it indicates that the additional transform is applied, only the subset of transforms that are allowed in combination with the additional transform can be signaled. In case the subset contains only one transform, no signaling is needed and the transform is inferred (e.g. if LFNST index is greater than 0, which signals that an LFNST is applied, the MTS index is not signaled and inferred to be equal to 0 instead, which corresponds to the DCT-II, illustrated in the simplified syntax diagram on the right-hand side of FIG. 14).

3. IMPLEMENTATION EXAMPLES

The primary transforms $T_i$ and $T_i^{(p)}$, shown in FIGS. 11*a* and 11*b*, may comprise one or more of:

DCT-II (or DCT-III), where DCT stands for Discrete Cosine Transform

DST-IV, where DST stands for Discrete Sine Transform

DCT-IV

DST-VII

Identity Transformation (IT)

The primary transforms $T_i$ and $T_i^{(p)}$ may be separable transforms.

The secondary transforms $T_i^{(s)}$ may be non-separable transforms which are applied to the primary transform's $T_i^{(p)}$ coefficients within subarea 106 to yield the coefficients of the final transform coefficient block 104 in forward direction at the encoder, wherein the decoder reverses the resulting multistage-transform $T_i^{(s)} \cdot T_i^{(p)}$ by applying a reverse transform $T^{-1}$ onto the transform coefficient block 104 to obtain the sample block 84.

The following notes shall be made. The orders 114 and 110 were are not restricted to the shown examples of diagonal scanning from the (horizontally and vertically) highest frequency coefficient (located at the opposite corner of block 104 relative to the last scanned position 101 which may be the DC coefficient) and not necessarily scan the coefficients along a sub-block-wise scanning process of scanning all coefficients within a sub-block first before preceding to another sub-block. Further, sub-array 106 is not restricted to be 16×16 coefficients large and may be any rectangular sub-array of coefficients extending from the last scanning position 101 to an opposite corner within block 104.

Further, FIG. 11*a* was merely illustrative. More than one primary-only transform may be contained in set 132. This is depicted in FIG. 11*b*. The primary transforms $T_1^{(p)}$ to $$T_1^{(p)} \text{ to } T_{N_3}^{(p)}$$

of the multistage transforms 136 may not be equal to another, but may have different members in set 136 of which one or more may belong to the primary-only transforms of set 132, or not.

Further, merely because of the constellation that, as exemplarily shown in FIG. 11*a*, $T_1^{(p)} = \ldots = T_{N2}^{(p)} = T_0$, it has been possible to regard the indicator 124 as being indicative of the multi-stage transform chosen, in case indicating no primary-only transform, or as being indicative of the secondary transform chosen, in case indicating no primary-only transform. Indicator 124 may alternatively be interpreted as indicating, if still available, the secondary transform.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded signal such as a video signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. An apparatus for decoding a picture or a video, the apparatus configured to perform operations comprising:

decoding, from a data stream, coefficient position information that indicates a coefficient position of a non-zero coefficient within a transform block;

determining, based on the coefficient position of the non-zero coefficient within the transform block, that at least one non-zero coefficient is located outside an area of the transform block; and based on the determining, selecting a transform to apply to the transform block, wherein the selecting of the transform comprises: inferring that a value of a Multi Transform Selection index (mts_idx) is equal to zero, wherein the value of mts_idx is not signaled in the data stream, and wherein the value of mts_idx indicates the transform to apply.

2. The apparatus of claim 1, wherein the coefficient position of the non-zero coefficient comprises a last significant coefficient position in a scan order within the transform block.

3. The apparatus of claim 1, wherein the area of the transform block comprises a top-left 16×16 area of the transform block.

4. The apparatus of claim 1, wherein the selected transform comprises Discrete Cosine Transform (DCT) II.

5. An apparatus for encoding a picture or a video, the apparatus configured to perform operations comprising:

encoding, into a data stream, coefficient position information that indicates of a coefficient position of a non-zero coefficient within a transform block;

determining, based on the coefficient position of the non-zero coefficient within the transform block, that at least one non-zero coefficient is located outside an area of the transform block; and based on the determining, selecting a transform to apply to the transform block, wherein the selecting of the transform comprises: inferring that a value of a Multi Transform Selection index (mts_idx) is equal to zero, wherein the value of mts_idx is not signaled in the data stream, and wherein the value of mts_idx indicates the transform to apply.

6. The apparatus of claim 5, wherein the coefficient position of the non-zero coefficient comprises a last significant coefficient position in a scan order within the transform block.

7. The apparatus of claim 5, wherein the area of the transform block comprises a top-left 16×16 area of the transform block.

8. The apparatus of claim 5, wherein the selected transform comprises Discrete Cosine Transform (DCT) II.

9. A method of decoding a picture or a video, the method comprising:

decoding, from a data stream, coefficient position information that indicates a coefficient position of a non-zero coefficient within a transform block;

determining, based on the coefficient position of the non-zero coefficient within the transform block, that at least one non-zero coefficient is located outside an area of the transform block; and based on the determining, selecting a transform to apply to the transform block, wherein the selecting of the transform comprises: inferring that a value of a Multi Transform Selection index (mts_idx) is equal to zero, wherein the value of mts_idx is not signaled in the data stream, and wherein the value of mts_idx indicates the transform to apply.

10. The method of claim 9, wherein the coefficient position of the non-zero coefficient comprises a last significant coefficient position in a scan order within the transform block.

11. The method of claim 9, wherein the area of the transform block comprises a top-left 16×16 area of the transform block.

12. The method of claim 9, wherein the selected transform comprises Discrete Cosine Transform (DCT) II.

13. A non-transitory storage medium having program code, which when executed by at least one processor causes the at least one processor to perform the method of claim 9.

14. A method of encoding a picture or a video, the method comprising:

encoding, into a data stream, coefficient position information that indicates of a coefficient position of a non-zero coefficient within a transform block;

determining, based on the coefficient position of the non-zero coefficient within the transform block, that at least one non-zero coefficient is located outside an area of the transform block; and based on the determining, selecting a transform to apply to the transform block, wherein the selecting of the transform comprises: inferring that a value of a Multi Transform Selection index (mts_idx) is equal to zero, wherein the value of mts_idx is not signaled in the data stream, and wherein the value of mts_idx indicates the transform to apply.

15. The method of claim 14, wherein the coefficient position of the non-zero coefficient comprises a last significant coefficient position in a scan order within the transform block.

16. The method of claim 14, wherein the area of the transform block comprises a top-left 16×16 area of the transform block.

17. The method of claim 14, wherein the selected transform comprises Discrete Cosine Transform (DCT) II.

18. A non-transitory storage medium having program code, which when executed by at least one processor causes the at least one processor to perform the method of claim 14.

* * * * *